US011198227B2

(12) United States Patent
Holyoak et al.

(10) Patent No.: US 11,198,227 B2
(45) Date of Patent: Dec. 14, 2021

(54) ADJUSTABLE BALLAST SYSTEM AND METHOD FOR SAME

(71) Applicant: Raytheon Company, Waltham, MA (US)

(72) Inventors: Vonn L. Holyoak, Vail, AZ (US); Bryan R. Moosman, Tucson, AZ (US); Anthony R. Vulcano, Vail, AZ (US)

(73) Assignee: Raytheon Company, Waltham, MA (US)

( * ) Notice: Subject to any disclaimer, the term of this patent is extended or adjusted under 35 U.S.C. 154(b) by 158 days.

(21) Appl. No.: 16/209,589

(22) Filed: Dec. 4, 2018

(65) Prior Publication Data

US 2020/0171678 A1 Jun. 4, 2020

(51) Int. Cl.
*B25J 19/00* (2006.01)
*B25J 13/08* (2006.01)
*B25J 19/02* (2006.01)

(52) U.S. Cl.
CPC .......... *B25J 19/002* (2013.01); *B25J 13/085* (2013.01); *B25J 19/02* (2013.01)

(58) Field of Classification Search
CPC ......... B25J 19/002; B25J 19/02; B25J 13/085
USPC ....................................................... 700/245
See application file for complete search history.

(56) References Cited

U.S. PATENT DOCUMENTS

| | | | |
|---|---|---|---|
| 3,320,795 A | 5/1967 | Monroe et al. | |
| 3,992,933 A | 11/1976 | Randolph, Jr. | |
| 4,161,876 A | 7/1979 | Carpenter | |
| 4,213,330 A | 7/1980 | Brozel et al. | |
| 4,705,999 A | 11/1987 | Soji et al. | |
| 5,081,865 A | 1/1992 | Schechter et al. | |
| 5,581,166 A | 12/1996 | Eismann et al. | |

(Continued)

FOREIGN PATENT DOCUMENTS

| | | |
|---|---|---|
| DE | 102014220085 A1 | 4/2016 |
| EP | 0937974 A2 | 8/1999 |

(Continued)

OTHER PUBLICATIONS

"U.S. Appl. No. 15/406,944, 312 Amendment filed Jun. 19, 2019", 10 pgs.

(Continued)

*Primary Examiner* — Khoi H Tran
*Assistant Examiner* — Rodney P King
(74) *Attorney, Agent, or Firm* — Schwegman Lundberg & Woessner, P.A.

(57) ABSTRACT

A testing system configured to determine at least one physical characteristic of a work piece. The testing system includes an effector frame having an effector interface configured for coupling with a manipulator assembly. The effector frame includes at least one torque sensor. A ballast bracket is configured for coupling between the at least one torque sensor and the work piece. The ballast bracket includes a sensor interface coupled with the at least one torque sensor, and at least one work piece latch configured for coupling with the work piece. A movable ballast assembly is coupled with the ballast bracket, and includes a counter ballast movably coupled with the ballast bracket and movable relative to the at least one torque sensor. A ballast actuator coupled with the counter ballast is configured to move the counter ballast relative to the at least one torque sensor.

34 Claims, 10 Drawing Sheets

(56) References Cited

U.S. PATENT DOCUMENTS

| | | | |
|---|---|---|---|
| 5,737,500 A | 4/1998 | Seraji et al. | |
| 5,767,648 A | 6/1998 | Morel et al. | |
| 5,781,705 A | 7/1998 | Endo | |
| 5,789,890 A | 8/1998 | Genov et al. | |
| 5,811,951 A | 9/1998 | Young | |
| 6,023,645 A | 2/2000 | Harima et al. | |
| 6,121,743 A | 9/2000 | Genov et al. | |
| 7,765,023 B2 | 7/2010 | Oaki et al. | |
| 8,042,408 B2 * | 10/2011 | Geyer | B25J 15/04 73/856 |
| 8,401,702 B2 * | 3/2013 | Okazaki | B25J 5/007 700/260 |
| 8,482,242 B2 | 7/2013 | Nakasugi | |
| 8,594,847 B2 | 11/2013 | Schreiber et al. | |
| 8,874,357 B2 | 10/2014 | Wolfram et al. | |
| 9,186,795 B1 | 11/2015 | Edsinger et al. | |
| 9,272,417 B2 * | 3/2016 | Konolige | B25J 15/0616 |
| 9,272,743 B2 | 3/2016 | Thielman et al. | |
| 9,314,922 B2 * | 4/2016 | Dockter | B25J 13/025 |
| 9,696,221 B2 * | 7/2017 | Lauzier | B25J 9/0081 |
| 9,808,933 B2 * | 11/2017 | Lin | B25J 15/0616 |
| 9,897,507 B2 * | 2/2018 | Vulcano | G01M 1/122 |
| 10,369,702 B2 | 8/2019 | Vulcano et al. | |
| 10,709,512 B2 * | 7/2020 | Bajo | A61B 90/03 |
| 10,730,189 B2 * | 8/2020 | Kuroda | A61B 34/30 |
| 2005/0166413 A1 | 8/2005 | Crampton | |
| 2005/0246061 A1 | 11/2005 | Oaki et al. | |
| 2007/0021870 A1 | 1/2007 | Nagasaka | |
| 2007/0288124 A1 | 12/2007 | Nagata et al. | |
| 2009/0249750 A1 | 10/2009 | Black et al. | |
| 2011/0004343 A1 | 1/2011 | Iida | |
| 2011/0135437 A1 | 6/2011 | Takeshita et al. | |
| 2012/0010748 A1 | 1/2012 | Sasai | |
| 2012/0035763 A1 | 2/2012 | Motoyoshi | |
| 2012/0215357 A1 | 8/2012 | Igarashi et al. | |
| 2012/0215358 A1 | 8/2012 | Gettings et al. | |
| 2012/0277912 A1 | 11/2012 | Kirihara | |
| 2012/0324991 A1 | 12/2012 | Goertz et al. | |
| 2013/0190926 A1 | 7/2013 | Motoyoshi et al. | |
| 2013/0197792 A1 | 8/2013 | Wolfram et al. | |
| 2014/0031977 A1 | 1/2014 | Goldenberg et al. | |
| 2014/0046483 A1 | 2/2014 | Oaki | |
| 2014/0288703 A1 | 9/2014 | Takagi | |
| 2014/0316573 A1 | 10/2014 | Iwatake | |
| 2014/0331748 A1 | 11/2014 | Watanabe | |
| 2014/0358280 A1 | 12/2014 | Shinozaki | |
| 2015/0114149 A1 | 4/2015 | Gomi et al. | |
| 2015/0120050 A1 | 4/2015 | Gomi et al. | |
| 2015/0127147 A1 | 5/2015 | Yamazaki et al. | |
| 2015/0328771 A1 | 11/2015 | Yuelai | |
| 2016/0305842 A1 | 10/2016 | Vulcano | |
| 2018/0003589 A1 | 1/2018 | Akiyama et al. | |
| 2018/0104825 A1 | 4/2018 | Vulcano et al. | |
| 2018/0133860 A1 | 5/2018 | Fujita et al. | |
| 2018/0169854 A1 | 6/2018 | Shiratsuchi | |
| 2018/0281186 A1 * | 10/2018 | Hiraide | B25J 9/1633 |
| 2020/0171673 A1 | 6/2020 | Moosman et al. | |

FOREIGN PATENT DOCUMENTS

| | | |
|---|---|---|
| EP | 2574896 A2 | 4/2013 |
| GB | 1470352 A | 4/1977 |
| JP | 0719982 A | 1/1995 |
| WO | WO-2018075525 A1 | 4/2018 |
| WO | WO-2020117674 A1 | 6/2020 |
| WO | WO-2020117746 A1 | 6/2020 |

OTHER PUBLICATIONS

"International Application Serial No. PCT/US2017/056988, International Preliminary Report on Patentability dated May 2, 2019", 12 pgs.

"U.S. Appl. No. 14/689,125, Corrected Notice of Allowance dated Jan. 25, 2018", 2 pgs.

"U.S. Appl. No. 14/689,125, Non Final Office Action dated May 5, 2017", 8 pgs.

"U.S. Appl. No. 14/689,125, Notice of Allowance dated Sep. 5, 2017", 8 pgs.

"U.S. Appl. No. 14/689,125, Response filed Aug. 7, 2017 to Non-Final Office Action dated May 5, 2017", 11 pgs.

"U.S. Appl. No. 14/689,125, Response filed Dec. 5, 2017 to Examiner's Reasons for Allowance dated Sep. 5, 2017", 1 pg.

"U.S. Appl. No. 15/406,944, Non Final Office Action dated Sep. 21, 2018", 27 pgs.

"International Application Serial No. PCT/US2017/056988, International Search Report dated Dec. 28, 2017", 2 pgs.

"International Application Serial No. PCT/US2017/056988, Written Opinion dated Dec. 28, 2017", 10 pgs.

Siouris, George, "The Generalized Missile Equations of Motion", Missile Guidance and Control Systems, Copyright Springer-Verlag New York, Inc., (2004), 15-51.

"U.S. Appl. No. 15/406,944, Notice of Allowance dated Mar. 21, 2019", 8 pgs.

"U.S. Appl. No. 15/406,944, Response filed Jan. 22, 2019 to Non-Final Office Action dated Sep. 21, 2018", 19 pgs.

"U.S. Appl. No. 16/209,556, Notice of Allowance dated Feb. 8, 2021", 6 pgs.

"U.S. Appl. No. 16/209,556, Notice of Allowance dated Oct. 5, 2020", 10 pgs.

"European Application Serial No. 17862064.7, Extended European Search Report dated May 18, 2020", 5 pgs.

"European Application Serial No. 17862064.7, Response filed Dec. 15, 2020 to Extended European Search Report dated May 18, 2020", 43 pgs.

"International Application Serial No. PCT/US2019/064008, International Search Report dated Mar. 16, 2020", 5 pgs.

"International Application Serial No. PCT/US2019/064008, Written Opinion dated Mar. 16, 2020", 7 pgs.

"International Application Serial No. PCT/US2019/064144, International Search Report dated Apr. 6, 2020", 4 pgs.

"International Application Serial No. PCT/US2019/064144, Written Opinion dated Apr. 6, 2020", 6 pgs.

Atkeson, Christopher, et al., "Rigid body load identification for manipulators", 24th IEEE Conference on Decision and Control, (Dec. 1, 1985), 996-1002.

Bonev, Llian, "What is the workspace of a typical sis-axis industrial robot arm?", (2018), 19 pgs.

Swevers, J, et al., "Dynamic Model Identification for Industrial Robots", IEEE Control Systems Magazine, IEEE Service Center, Piscataway, NJ, US, vol. 27, No. 5, (Oct. 1, 2007), 58-71.

"International Application Serial No. PCT US2019 064144, International Preliminary Report on Patentability dated Jun. 17, 2021", 8 pgs.

"International Application Serial No. PCT US2019 064008, International Preliminary Report on Patentability dated Jun. 17, 2021", 9 pgs.

* cited by examiner

ADJUSTABLE BALLAST SYSTEM AND METHOD FOR SAME

CROSS-REFERENCE TO RELATED PATENT DOCUMENTS

This patent application is related to U.S. Pat. No. 9,897,507 entitled "AUTOMATED WORK PIECE CENTER OF MASS IDENTIFICATION SYSTEM AND METHOD FOR SAME," filed on Apr. 17, 2015, which is hereby incorporated by reference herein in its entirety.

This patent application is related to U.S. patent application Ser. No. 15/406,944 entitled "AUTOMATED WORK PIECE MOMENT OF INERTIA IDENTIFICATION SYSTEM AND METHOD FOR SAME," filed on Jan. 16, 2017 and having a priority date of Oct. 17, 2016, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raytheon Company of Waltham, Mass. All Rights Reserved.

TECHNICAL FIELD

This document pertains generally, but not by way of limitation, to systems and methods for measuring one or more of weight, center of gravity or moment of inertia of a work piece.

BACKGROUND

Determining physical characteristics, such as center of mass, moment of inertia or the like, of discrete parts of an overall assembly (a work piece) relatively straightforward with center of mass calculations including knowledge of the dimensions of the part (e.g., shape and size) and its mass. Determination of the physical characteristics, such as center of mass (CM or center of gravity, CG), moment of inertia (MOI) is more complex when parts are incorporated as a whole into an overall assembly. The overall assembly includes a variety of parts, in varying orientations, constructed with different materials that are coupled together. The assembly is difficult to model because of the various orientations and profiles of the parts and the varying materials. The center of mass of the assembly is used in the control of assemblies including launch vehicles and payloads (satellites and the like). For instance, the center of mass is identified to ensure precise and predictable control including, but not limited to, control of pitch, yaw, roll and the like during launch, delivery and operation of a payload.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
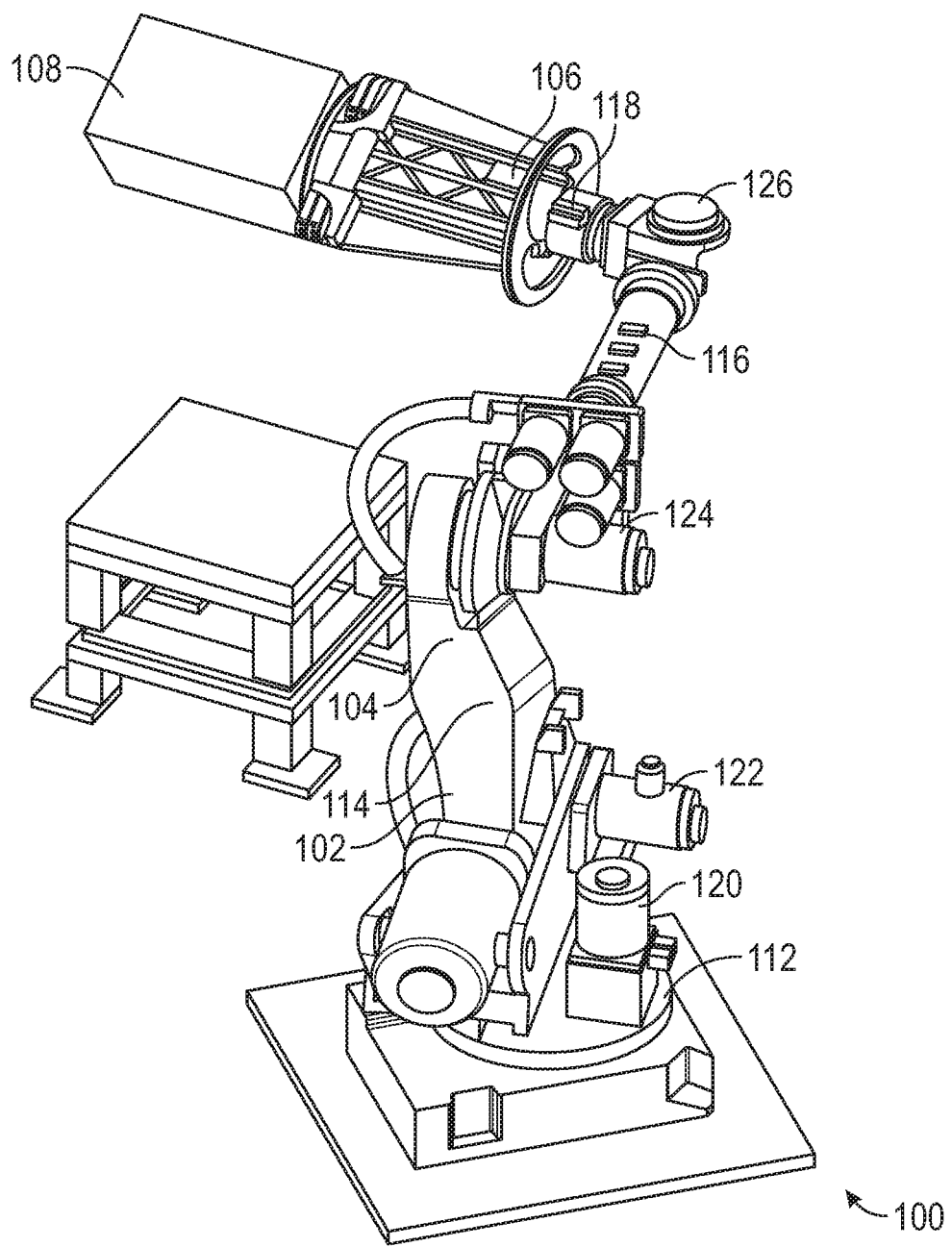
FIG. 1A is a perspective view of one example of a manipulation and testing system.

Load tables are used to measure center of mass (CM or center of gravity, CG) with assemblies having multiple component parts assembled together. The assembly is brought to a facility having a load table of sufficient size and capacity to carry the assembly (e.g., in some examples weighing thousands of pounds). One or more 'critical lifts' are performed to move the assembly from a fixture to the load table, orient and reorient the assembly on the load table, and then to move the assembly back to the original fixture. In one or more orientations the assembly is fixed to the table (e.g., bolted) to ensure the assembly remains in a particular orientation. Load cells measure the weight of the assembly. For instance, the load cells are spaced around the load table and measure portions of the assembly weight incident on the respective load cells. The measurements are used in combination with the relative location of the load cells to determine the assembly center of mass in two dimensions forming a plane parallel to the load table (e.g., X/Y, Y/Z or X/Z). The assembly is then unbolted from the load table, and in another 'critical lift', reoriented relative to the first orientation to move the first plane, such as the X/Y plane, out of alignment to the load table. In this second orientation weight measurements are taken again and a second assembly center of mass is determined in the updated dimensions (e.g., Y/Z if the first plane was X/Y).

After the measurements are taken the assembly is unbolted from the load table, returned to a fixture with another 'critical lift' and returned for further production, testing or the like. The measurement of the center of mass in each of the two orientations is combined to identify the coordinates of the assembly center of mass.

The present inventors have recognized, among other things, that a problem to be solved includes decreasing time and labor needed to accurately and repeatably identify physical characteristics of a work piece. Identification of characteristics, such as center of mass and moment of inertia, with load tables involves a relatively complex testing setup with a dedicated load table including an array of load cells. Additionally, the work piece (sometimes weighing hundreds or thousands of pounds) is moved with a plurality of 'critical lifts' to move the work piece to the table, orient the work piece, reorient the work piece for additional measurements and also return the work piece to a fixture for additional processing (e.g., assembly, installation or the like). Critical lifts are intensive time consuming events that require extensive documentation, checklists and review before each lift is conducted to ensure the work piece is not damaged. Accordingly, in some examples, identifying work piece physical characteristics is a full day process (20 hours or more) from the first critical lift, testing in various orientations each using a critical lift, and the last critical lift to the original fixture. Further, removal of the work piece from production to identify physical characteristics extends overall production time and requires significant additional labor.

In an example, the present subject matter provides a solution to these problems, such as by automatically identifying one or more work piece physical characteristics with a manipulator assembly configured to measure one or more of force, torque or motion of the work piece. The manipulator assembly orients the work piece in at least two different orientations relative to a reference force (e.g., gravity in one example) and measures at least one of force or torque incident on a force and torque sensor or the motion response of the work piece (e.g., rotation, rotational velocity or rotational acceleration) in each of the orientations. The one or more force or torque measurements in each of the at least two orientations are used to identify the center of mass of the work piece. Dynamic measured force or torque and motion of the work piece (motion response or motion feedback) in one or more orientations are used to identify various moments of inertia (MOI) around corresponding axes (e.g., X, Y, Z or yaw, pitch, roll and 45 degree off-axis measurements for products of inertia, POI). Motion of the work piece is recorded (and optionally determined) with a motion feedback sensor, position encoders associated with the manipulator or effector assembly or the like.

The coupling of the work piece to the manipulation assembly, movement, measurements and identification of the center of mass and MOI/POI (collectively physical characteristics of the work piece) are conducted in a rapid and accurate fashion (e.g., minutes or less to a few hours depending on weight and complexity of the work piece) in comparison to 20 hours or more with load tables, multiple critical lifts or the like.

In one example, the manipulator assembly includes a manipulator arm configured to reorient the work piece in the at least two different orientations. For example, the manipulator assembly includes a robotic manipulator arm configured to move with 6 degrees of freedom (3-axis rotation and 3-axis translation) to move the work piece in three-dimensional space. Optionally, the manipulator arm moves the work piece in such a manner that the motion includes a rotational component about each of the three axes for moment of inertia determination. In another example, the manipulator arm is configured to provide arbitrary three-dimensional motion to include all of the rotational components for MOI determination in one set of measurements. In still another example, the manipulator arm is configured to orient the work piece about an axis, rotate the work piece about the axis (e.g., parallel to a gravity or force vector and through the work piece center of gravity CG) to isolate the rotational components for each axis in different sets of measurements.

As described herein, the manipulator arm includes one or more force, torque or motion sensors (e.g., including separate or consolidated sensors), and these sensors (collectively a mechanics sensor suite) measure one or more of force, torque or motion of the work piece transmitted between the work piece and the manipulator arm (e.g., weight, moment of the work piece relative to the arm or the like). Optionally, the one or more force or torque sensors are included in an effector assembly. The effector assembly is grasped by the manipulator arm and the manipulator arm operates the effector assembly to couple with the work piece, for instance with manipulator and work piece interfaces, respectively.

Furthermore, a problem to be solved with measurements conducted with the mechanics sensor suite including a torque sensor includes minimizing measurement errors in the determination of physical characteristics of a work piece, such as center of mass and moment of inertia. For instance, sensors used in load tables and other measurement mechanisms, such as manipulator assemblies, are subject to low resolution measurements (decreased measurement accuracy) because of sensors having large ranges of operation. For instance, sensors using torque measurements to determine physical characteristics such as center of mass, moments of inertia or the like have large operating ranges because of the range of work pieces tested having various sizes and masses. Some example moment (torque) sensors are configured to measure moments of around 100 inch pounds while other moment sensors are configured to measure moments of around 5,000 inch pounds. Accuracy (e.g., a maximum error) for each of these sensors, in one example, is around 0.1 percent based on the range of operation. Accordingly, the actual accuracy or maximum error for the respective moment sensors described above is plus/minus 0.1 inch pounds for the 100 inch pound sensor and plus/minus 5 inch pounds for 5000 inch pound sensor, an order of magnitude difference. These measurement errors are based on operating range accuracy variations for each sensor. As shown herein, the measurement errors increase (e.g., actual accuracy decreases) with larger operating ranges for the sensors. Further still, the force and torque measurements are used for the determination of physical characteristics of a work piece, such as center of mass (e.g., CM or center of gravity, CG) and one or more moments of inertia including products of inertia. Measurement errors for torque are carried into the physical characteristic determinations and accordingly negatively affect the accuracy of the determined characteristics.

The present subject matter provides a solution to this type of measurement error based on decreased accuracy with large sensor operating ranges. The manipulator assembly, effector assembly (coupled with the manipulator assembly) or the like described herein includes an adjustable ballast system that positions a composite center of mass (for the work piece and a counter ballast) proximate to a sensor, such as a torque sensor. In one example, the adjustable ballast system includes a counter ballast movably positioned relative to the sensor. For instance, the counter ballast is coupled with a carriage, and the carriage is movably coupled along one or more guides extending away from the sensor. With the work piece coupled with the effector assembly or the manipulator assembly the counter ballast is moved along the rails until the center of mass of the composite assembly of the work piece and the counter ballast (e.g., an adapted center of mass) is proximate to the torque sensor. For example, the torque sensor measures a minimized moment (e.g., zero (0) or one or more inch pounds or the like) indicating the center of mass is proximate (aligned, substantially adjacent or the like) to a sensor plane of the torque sensor. With this arrangement a torque sensor having a small operating range of 100 inch pounds or less is used for measurement because of the minimized torque instead of a sensor having a large operating range (e.g., one or more thousands of inch pounds) having a corresponding poor actual accuracy or increased measurement error because of the large operating range. As discussed by example herein the torque sensor having the smaller operating range of 100 inch pounds has a corresponding increased actual accuracy (e.g., 0.1 inch pounds in contrast to 5 inch pounds for the larger 5000 inch pound sensor).

Furthermore, because the counter ballast is movably positioned along guides including tracks, rails, grooves, posts or the like movement of the counter ballast provides a continuous range of counter balancing torques and composite center of mass locations based on the resolution of counter ballast movement (e.g., corresponding to a type of carriage actuator and encoder). Accordingly, decoupling, installation, and assessment of multiple counterweights is minimized. Instead, the technician or (automated) controller moves the counter ballast having a substantially static mass along the one or more rails relative to the sensor until a specified torque measurement is obtained (e.g., a minimal torque measurement such as zero or one or more inch pounds) indicating the composite center of mass or adapted center of mass for the composite assembly of the work piece and the counter ballast is proximate to the sensor plane of the torque sensor.

This overview is intended to provide an overview of subject matter of the present patent application. It is not intended to provide an exclusive or exhaustive explanation of the invention. The detailed description is included to provide further information about the present patent application.

FIG. 1A shows one example of a manipulation and testing system 100. As described herein the manipulation and testing system 100 is configured to measure one or more, force, torque, position, velocity or acceleration (including rotational equivalents) and determine one or more characteristics including the location of a center of mass (including the center of mass and center of gravity) of a work piece, moments of inertia (e.g., MOI, POI or the like) of the work piece, such as the work piece 108 coupled with the system 100. As shown, the manipulation and testing system 100 includes a manipulator arm assembly 102 and one or more of force, torque or motion sensors (including a consolidated sensor) associated with the manipulator arm assembly. As will be further described herein one or more of the work piece center of mass, moments of inertia or the like are determined in one example as the manipulator arm assembly 102 orients the work piece 108 between two or more orientations, for instance while moving between two pieces of equipment of an assembly line or testing line.

Referring again to FIG. 1A, the manipulation and testing system 100 includes in an example a manipulator arm assembly 102 and one or more force, torque or motion sensors coupled with the manipulator arm assembly 102. In the example shown, the one or more force, torque or motion torque sensors (collectively mechanics sensors) are interposed between the work piece 108 and the manipulator arm assembly 102 proximate an effector assembly 106. As shown in the example of FIG. 1A, the effector assembly 106 is coupled with the manipulator assembly 102 at an effector interface 118. In another example, the effector assembly 106 is integral to the manipulator assembly 102. For instance, the effector assembly 106 including the one or more force, torque or motion sensors (mechanics sensors) provided as a component of the effector interface 118.

The manipulator assembly 102 shown in FIG. 1A includes a multiple degree of freedom robotic arm (e.g., a manipulator arm 104). As shown, the manipulator arm 104 includes a manipulator base 112, a manipulator boom 114 and a manipulator arm member 116 coupled together at a plurality of joints interposed therebetween. As further shown in FIG. 1A, each of the manipulator base 112, the manipulator boom 114, the manipulator arm member 116 as well as the effector interface 118 are operated (rotated, twisted, spun or the like) with one or more actuators at joints. For instance, as shown in FIG. 1A the manipulator base 112 is shown coupled with the manipulator boom 114 with an interposing base actuator 120 that provides rotational actuation for the manipulator arm 104. As further shown, a boom actuator 122 is interposed between the manipulator boom 114 and the manipulator base 112 (e.g., coupled with a portion of the base actuator 120) to accordingly provide another axis of rotational movement for the manipulator arm 104. As further shown in FIG. 1A, an arm actuator 124 is interposed between the manipulator arm member 116 and the manipulator boom 114 to provide for rotational movement of the manipulator arm member 116 relative to the manipulator boom 114.

In yet another example, an interface actuator 126 is interposed between the manipulator arm member 116 and the effector interface 118 to accordingly provide one or more of rotation or tilting of the work piece 108 for instance by way of rotation or tilting of the effector interface 118 relative to the manipulator arm member 116. As shown in FIG. 1A, the work piece 108 is coupled with the manipulator arm member 116 by way of the effector interface 118. The manipulator arm 104 is in one example a multiple degree of freedom robotic arm manufactured or sold by ABB, Kuka, Staubli, Fanuc or other entities.

As described herein, in one example the manipulator arm assembly 102 includes the manipulator arm 104. One example of a manipulator arm 104 includes a robotic arm having a plurality of degrees of freedom (e.g., a multi-axis arm), for instance degrees of freedom provided by joints between one or more of the effector interface 118, the manipulator arm member 116, the manipulator boom 114 and the manipulator base 112. In another example, the manipulator arm assembly 102 includes one or more other manipulator systems including, but not limited to, multi-position and multi-axis fixtures coupled with the work piece 108. The fixtures are reoriented by way of a gyroscope, rails, positionable rings or the like to accordingly position the work piece 108 in two or more orientations, implement specified movement (e.g., for evaluation of moments of inertia) or the like used to identify physical characteristics of the work piece 108, such as center of mass, moments of inertia or the like. Accordingly, the manipulator arm assembly 102 is in some examples a plurality of systems including, but not limited to, the manipulator arm 104, gimbals, manipulation fixtures or the like configured to orient the work piece 108 in a plurality of orientations, move the work piece through specified movements or the like.

Figure 1B:
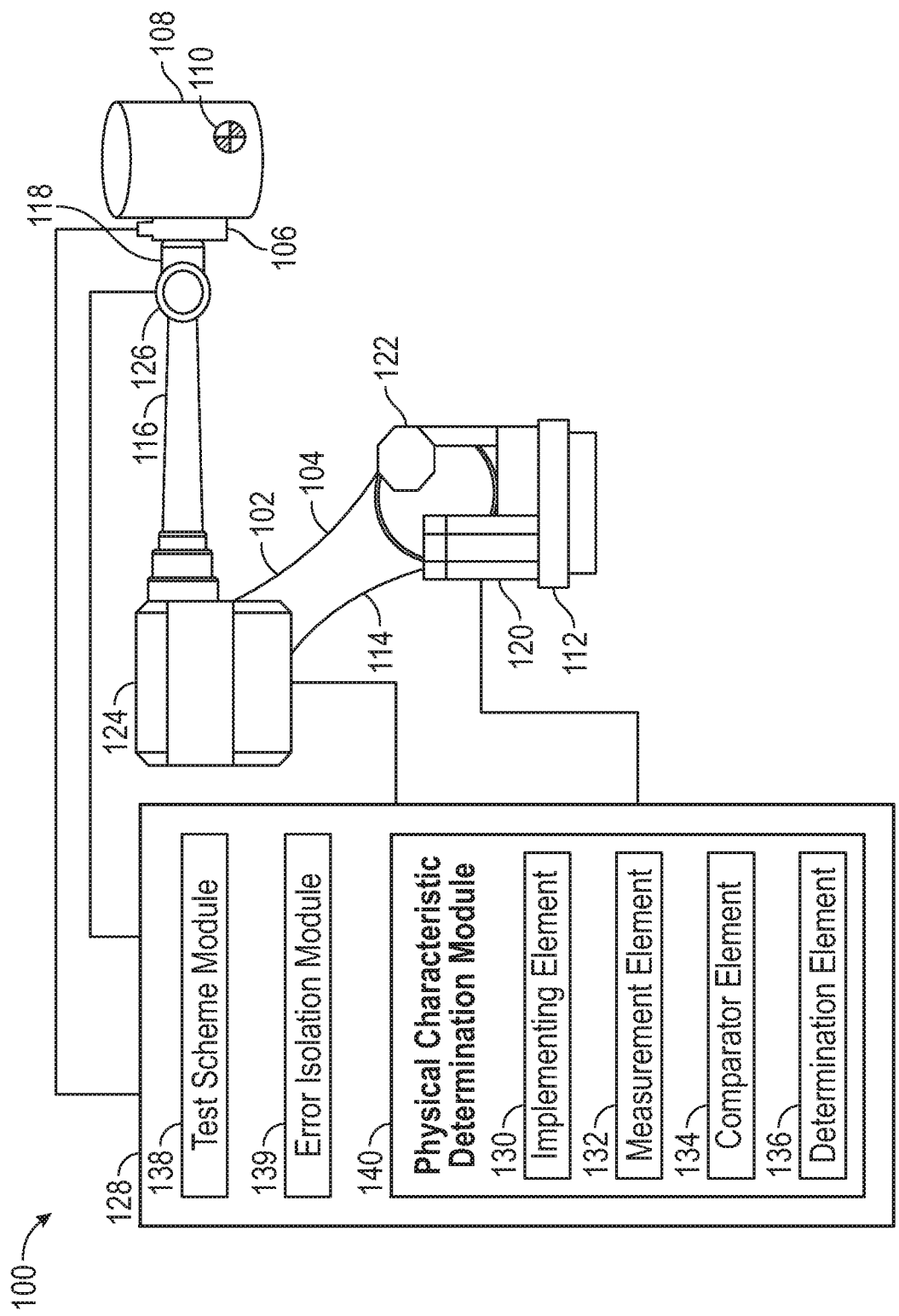
FIG. 1B is a schematic view of the manipulation and testing system of FIG. 1A.

FIG. 1B is a schematic diagram of the manipulation and testing system 100 shown in FIG. 1A. FIG. 1B includes a testing controller 128, such as a test scheme controller. The testing controller includes a test scheme module 138 having one or more test schemes. The test schemes each include one or more test configurations having specified orientations, movement or the like for use by the manipulator arm assembly 102. In other examples, the test schemes also control the measurement of one or more values, such as force, torque, position, velocity, acceleration or the like according to the specified test scheme. The testing controller 128 uses the one or more test schemes to measure values and determine characteristics of the work piece 108 including one or more of center of mass, moments of inertia or the like.

As shown in FIG. 1B, the testing controller 128 of the manipulation and testing system 100 is in communication with other components of the system 100 including, but not limited to, the manipulator arm assembly 102 (e.g., one or more of the actuators described herein) as well as the effector assembly 106 including for instance the mechanics sensors (e.g., configured to measure one or more force, torque, position, velocity or acceleration).

As further shown in FIG. 1B, the testing controller 128 includes a physical characteristic determination module 140 having one or more subelements (e.g., component modules) configured to control one or more of the manipulator arm assembly 102, the mechanics sensors described herein or analyze measurements and determine physical characteristics including, but not limited to, center of mass, moments of inertia or the like of the work piece 108. As shown, the physical characteristic determination module 140 includes an implementing element 130. The implementing element 130 is an interface with one or more of the base actuator 120, the boom actuator 122, the arm actuator 124 or the interface actuator 126 and implements the one or more orientations, movements or the like of the manipulator arm assembly 102 and the work piece 108. In another example, the implementing element 130 is the interface with the work piece 108 (e.g., through the effector assembly 106) and controls the configuration of the work piece 108. For instance, the implementing element 130 controls reconfiguring of the work piece 108 for the determination of a second center of mass, additional moments of inertia for a different configuration of the work piece or the like. In the example shown in FIG. 1B, the work piece 108 includes a work piece center of mass 110. In a reconfigured state, for instance with one or more portions of the work piece 108 removed or reoriented (corresponding to jettisoned rocket stages, fins, canards or the like, deployment of solar panels, instruments or the like), the work piece 108 has a second work piecework piece center of mass. In this example, the test scheme module 128 measures the work piece center of mass 110 (shown in FIG. 1) as well as second, third or supplemental centers of mass of the work piece 108 in various configurations (e.g., with solar panels deployed, components jettisoned or the like). Additionally the implementing element 130 moves the work piece 108 through the plurality of orientations, specified movements or the like to facilitate the measurement of values e.g., force, torque, kinematic values such as position, velocity or the like) associated with the work piece center of mass 110 (and supplemental work piece centers of mass as desired) as well as other characteristics such as moments of inertia.

As further shown in FIG. 1B, the physical characteristic determination module 140 of the testing module 128 includes a measurement element 132. The measurement element 132 is in communication with the mechanics sensors, such as a mechanics sensor suite, of the effector assembly 106. The measurement element 132 cooperates with the mechanics sensors to measure values such as force, torque, position, velocity or acceleration at the effector assembly 106 with the work piece 108 in different orientations, while moving or the like to determine one or more physical characteristics of the work piece 108 (e.g., center of mass, moments of inertia or the like).

As further shown in FIG. 1B, the physical characteristic determination module 140 optionally includes a comparator element 134 configured to compare one or more of the measured values, determined values of physical characteristics or the like with one or more threshold values. In various examples described herein, the comparator element 134 compares base measurements or determined values, taken or determined through implementing of a specified test scheme with counterpart measurements or determined values taken or determined from implementing one or more of the error isolation schemes described herein (e.g., a reverse load scheme, calibration scheme or the like). The comparison between these values isolates error common to both the base and counterpart values and facilitates removal of the isolated error from the measured values, determined physical characteristics or both.

A determination element 136 of the physical characteristic determination module 140 determines one or more of the physical characteristics of the work piece 108 based on values of one or more of measured force, torque, position, velocity or acceleration measured with the measurement element 132 in cooperation with the mechanics sensors. In one example, the determination element 136 removes (e.g., adjusts, offsets or the like) the isolated error identified with the comparator element 134 from one or more of the measured or determined values, characteristics or the like. As described herein, the removal of error from the values or characteristics enhances the accuracy and precision of determined characteristics, such as center of mass, moments or inertia as well as the measured values used in these determinations (e.g., one or more of force, torque, position, velocity, acceleration or the like).

In one example, the testing controller 128 includes an error isolation module 139 having one or more error isolation schemes. As described herein, the error isolation schemes provide one or more of orientations, movements, analysis of measurements, initializing of the system (e.g., through actuation of a counter ballast) or the like configured to minimize or isolate error in base measurements taken while implementing a test scheme. The refinement of the base measurements, for instance with removal of isolated error identified with the comparator element 134, enhances the precision and accuracy of determined values such as the physical characteristics. The error isolation module includes one or more error isolation schemes including, but not limited to, reverse loading schemes, calibration schemes (e.g., for use with a calibration unit), control of a counter ballast system or the like. Example error isolation schemes are described further herein.

As previously described, the manipulation and testing system 100 determines one or more physical characteristics of a work piece, including, but not limited to, center of mass, moments of inertia (including products of inertia) or the like. The system 100 measures values at mechanics sensors, such as the mechanics sensor suite 200 (see FIG. 2), including one or more of force, torque or motion (e.g., position, velocity, acceleration including rotational motion). The testing controller 128 determines the one or more physical characteristics based on the measured values. The mechanics sensor suite 200 and the testing controller 128 are included with the manipulation and testing system 100 having an effector assembly 106 integral to the system in one example. In another example, the mechanics sensor suite 200 and the testing controller 128 are included with an effector assembly 106 configured for coupling with the remainder of the system 100, such as a manipulator arm 104 proximate to the interface actuator 126, as shown in FIG. 1A.

Figure 2:
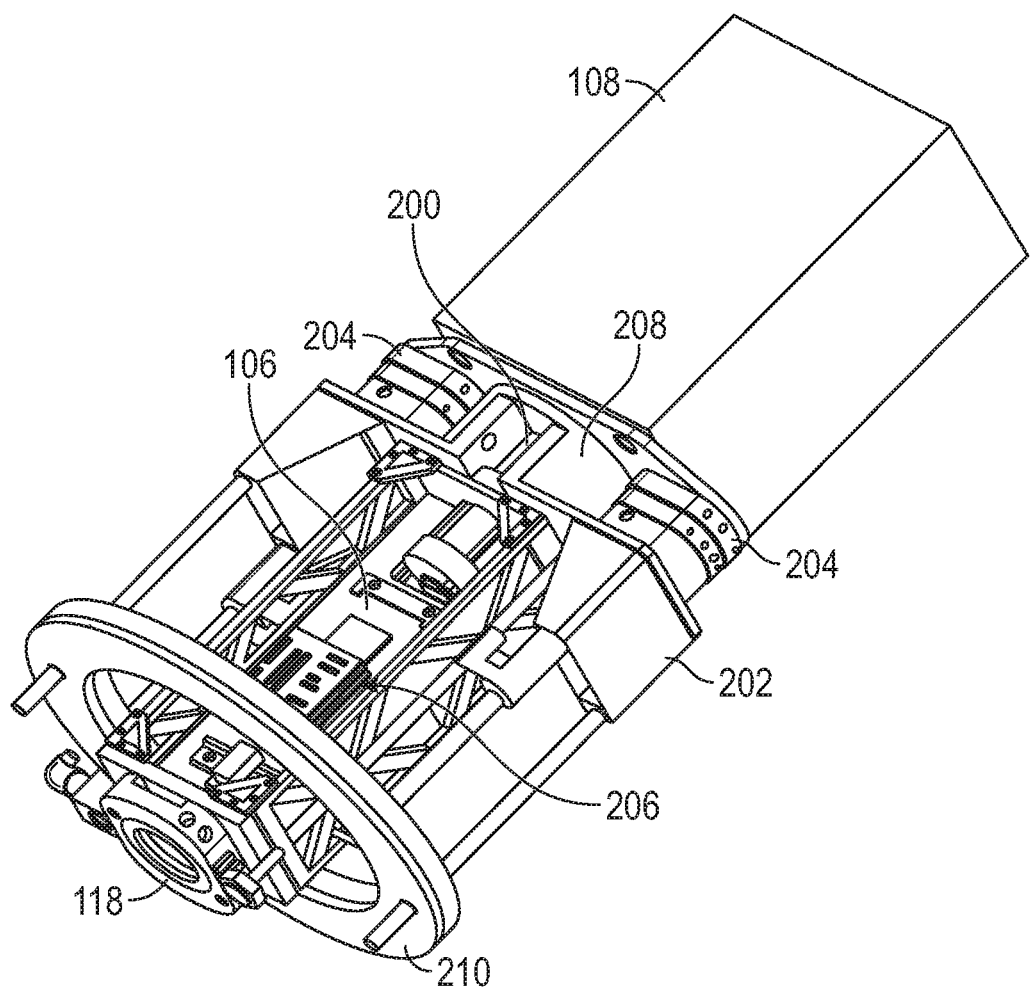
FIG. 2 is a perspective view of one example of an effector assembly having an adjustable ballast system.

FIG. 2 shows one example of an effector assembly 106, for instance corresponding to the effector assembly 106 previously shown in FIGS. 1A and 1B. In this example the effector assembly 106 includes an effector frame 206 extending between an effector interface 118 and a mechanics sensor suite 200. The mechanics sensor suite 200 is proximate a distal end of the effector assembly 106 relative to the effector interface 118, and includes one or more sensors including, but not limited to, force, torque, position, velocity, acceleration sensors, or the like. The mechanics sensors are configured to measure corresponding values or characteristics of the work piece 108 coupled with the effector assembly 106.

In the example shown in FIG. 2 the effector assembly 106 also includes an adjustable ballast system 202. As will be described herein the adjustable ballast system 202 is interposed between components of the effector assembly 106 and the work piece 108. The adjustable ballast system 202 includes a counter ballast 210 that is movable relative to a sensor interface 208 of the effector assembly 106 and the mechanics sensor suite 200. Movement of the counter ballast 210 changes the center mass of a composite assembly of the work piece 108 in combination with the counter ballast system 202 to accordingly provide a composite center of mass proximate (e.g., adjacent, coincident, aligned or the like) the mechanics sensor suite 200 and the sensor interface 208. As will be described herein the adjustable ballast system 202 when operated in this manner minimizes measurement error with a torque sensor of the mechanics sensor suite by facilitating the use of a minimized operating range.

As further shown in FIG. 2 the effector assembly 106 includes one or more work piece latches 204. In one example the work piece latches 204 include one or more posts, pins, interfittings or the like configured to engage with corresponding components of the work piece 108. The work piece latches 204 accordingly buckle or connect the work piece 108 to the effector assembly 106 to facilitate the movement and measurement of the work piece 108 in one or more of the orientations as described herein to determine one or more physical characteristics of the work piece 108, such as the moments of inertia of the work piece 108, center of mass or the like. In one example the work piece latches 204 connect a portion of the work piece 108 proximate to the sensor interface 208 of the effector assembly 106 (e.g., optionally a component of the adjustable ballast system 202 when included). One or more of force, torque, motion (including one or more position, velocity, acceleration or the like) are measured with the mechanics sensor suite 200 in close proximity to the work piece 108 under investigation.

Figure 3:
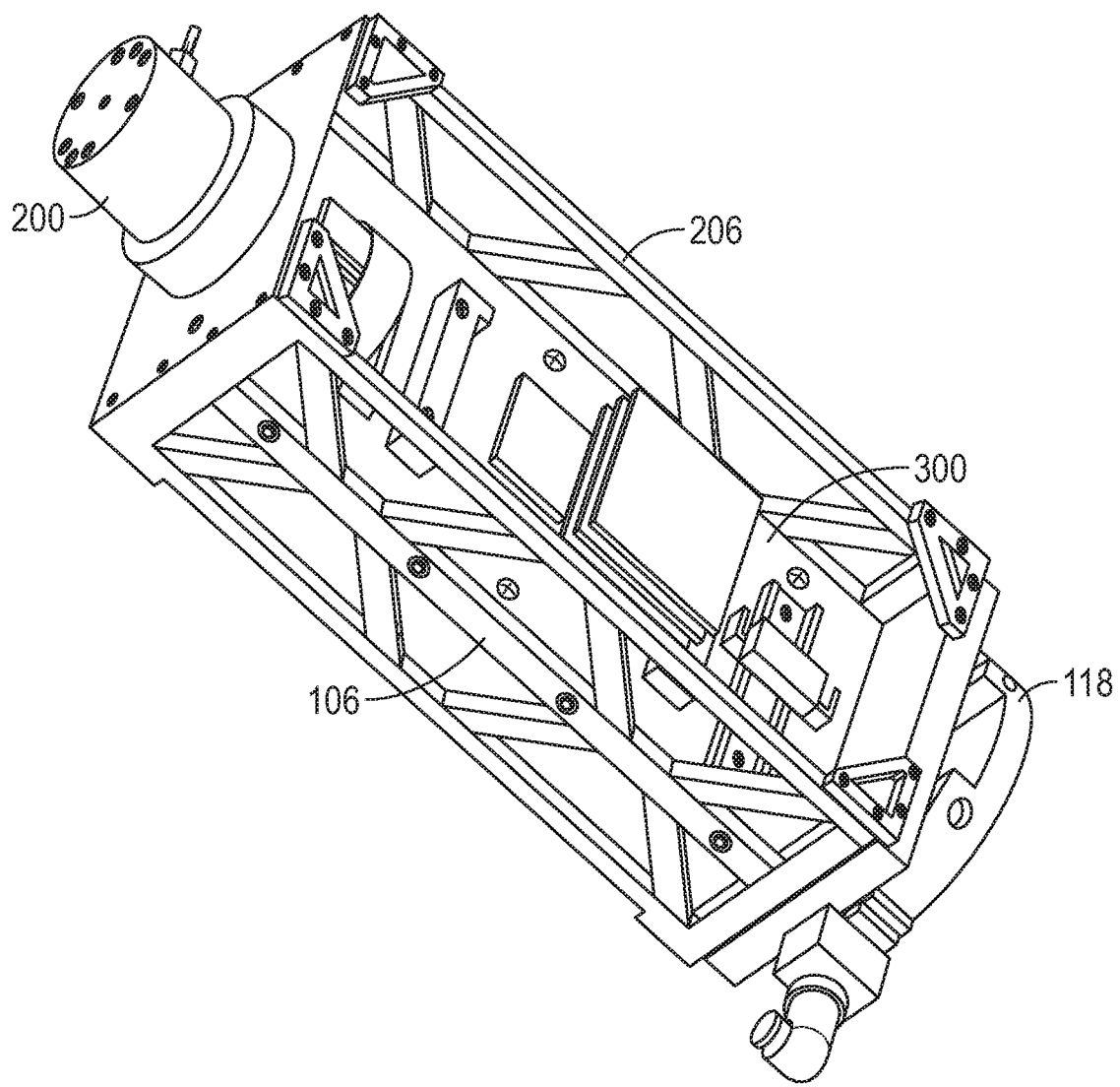
FIG. 3 is a detailed perspective view of the example effector assembly of FIG. 2.

FIG. 3 shows another view of the effector assembly 106 shown previously in FIG. 2. In this example the effector assembly 106 does not include the adjustable ballast system 202. Instead the mechanics sensor suite 200 is shown in an exposed configuration with the sensor interface 208 of the adjustable ballast system removed. As shown the effector frame 206 extends from the effector interface 106 to the mechanics sensor suite 200. In one example the effector assembly 106 includes a testing controller 300 including one or more of a processor, memory or other components used in combination with mechanics sensor suite 200 to measure one or more values such as force, torque, position, velocity, acceleration or the like and thereafter determine one or more physical characteristics of the work piece 108 shown in FIG. 2. For instance, in one example the mechanics sensor suite 200 measures one or more of force or torque as well as one or more of position, velocity or acceleration to determine physical characteristics such as the center of mass, one or more moments of inertia (including products of inertia) or the like of the work piece 108. The testing controller 200 in one example is coupled with the mechanics sensor suite 200 and uses values measured with the mechanics sensor suite 200 to determine these physical characteristics.

Optionally, the testing controller 100 as previously shown in FIG. 1B is in communication with one or more other components of a manipulation and testing system 100. For instance the testing controller is in communication with one or more of the actuators associated with the manipulation and testing system 100 whether in a manipulator arm 104 or the effector assembly 106 including, but not limited to, one or more actuators effector assembly or the manipulator arm 104. As described herein the testing controller 100 including a test scheme module 138 is configured to implement movement of the work piece 108 between orientations and move the work piece 108 while in orientations for measurement of one or more values for use in determining the physical characteristics.

Figure 4A:
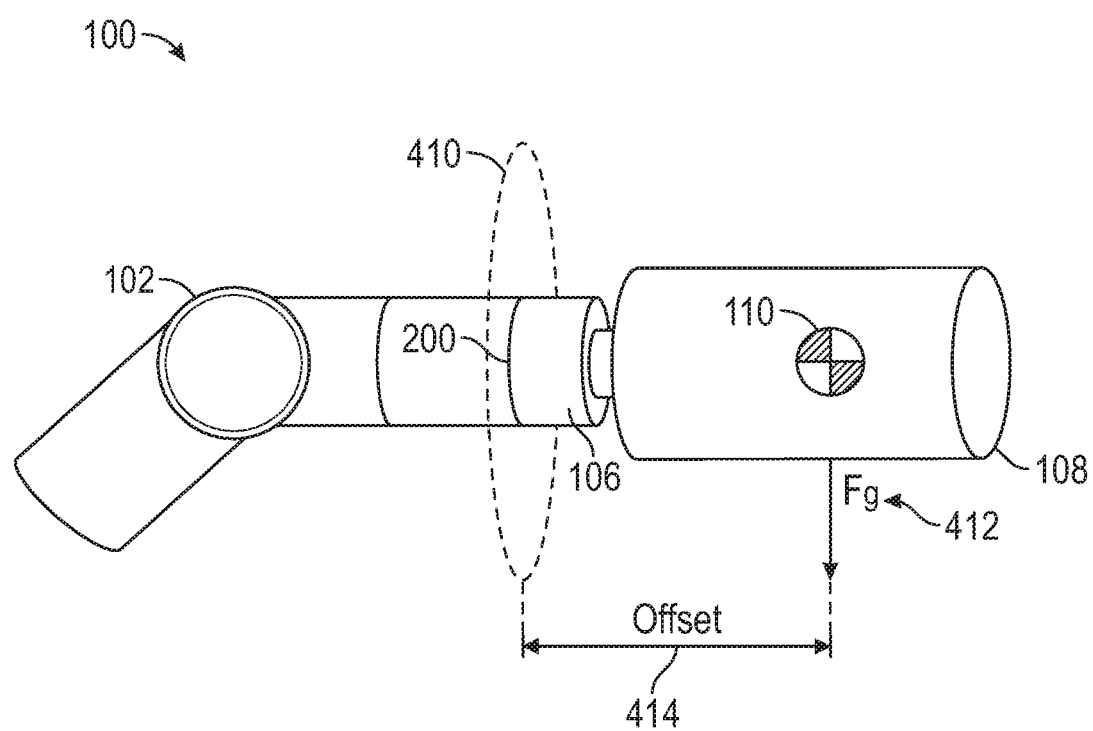
FIG. 4A is a schematic view of one example of a manipulation and testing system having a work piece with an offset center of mass relative to at least one sensor.

FIG. 4A is a schematic view of one example of the manipulation and testing system 100 including the effector assembly 106 coupled with the work piece 108. In the orientation shown the work piece 108 is suspended horizontally away from the mechanics sensor suite 200 of the effector assembly 106. As shown, the work piece 108 has a center of mass 110 (center of gravity) remote relative to a sensing plane 410 of the mechanics sensor suite 200. A gravity vector 412 (or other based force vector, for instance in a centrifuge or the like) is also shown in FIG. 4A. As further shown in FIG. 4A, the center of mass 110 is spaced with the illustrated offset, or offset moment arm 414. The mass of the work piece 108 with the offset moment arm 414 applies a corresponding moment, or offset moment, to the mechanics sensor suite 200 including one or more torque sensors configured to measure torque associated with the work piece 108, for instance to determine one or more physical characteristics including, but not limited to, center of mass, moments or inertia or the like.

The offset moment applied to the mechanics sensor suite 200 based on the mass of the work piece 108 (and the corresponding weight based on gravity 412) and the offset moment arm 414 loads the one or more torque sensors of the mechanics sensor suite and decreases the accuracy of torque measurements with the mechanics sensor suite 200. As stated herein, the operation of torque sensors over relatively large operating range such as thousands of inch pounds or Newton meters correspondingly increases measurement error. For example, if the one or more torque sensors of the mechanics sensor suite 200 have an example accuracy of 0.1 percent the resulting actual error of measurements correspondingly increases with larger torque measurements. With a torque measurement of 100 inch pounds, the corresponding actual error based on the 0.1 percent accuracy is ±0.1 inch pounds (or 100±0.1 inch pounds). In contrast, at higher torques, such as 5000 inch pounds, the corresponding actual error is ±5.0 inch pounds (or 5000±5.0 inch pounds). Accordingly, as the torque sensor of the suite 200 experiences greater loading its accuracy decreases.

Figure 4B:
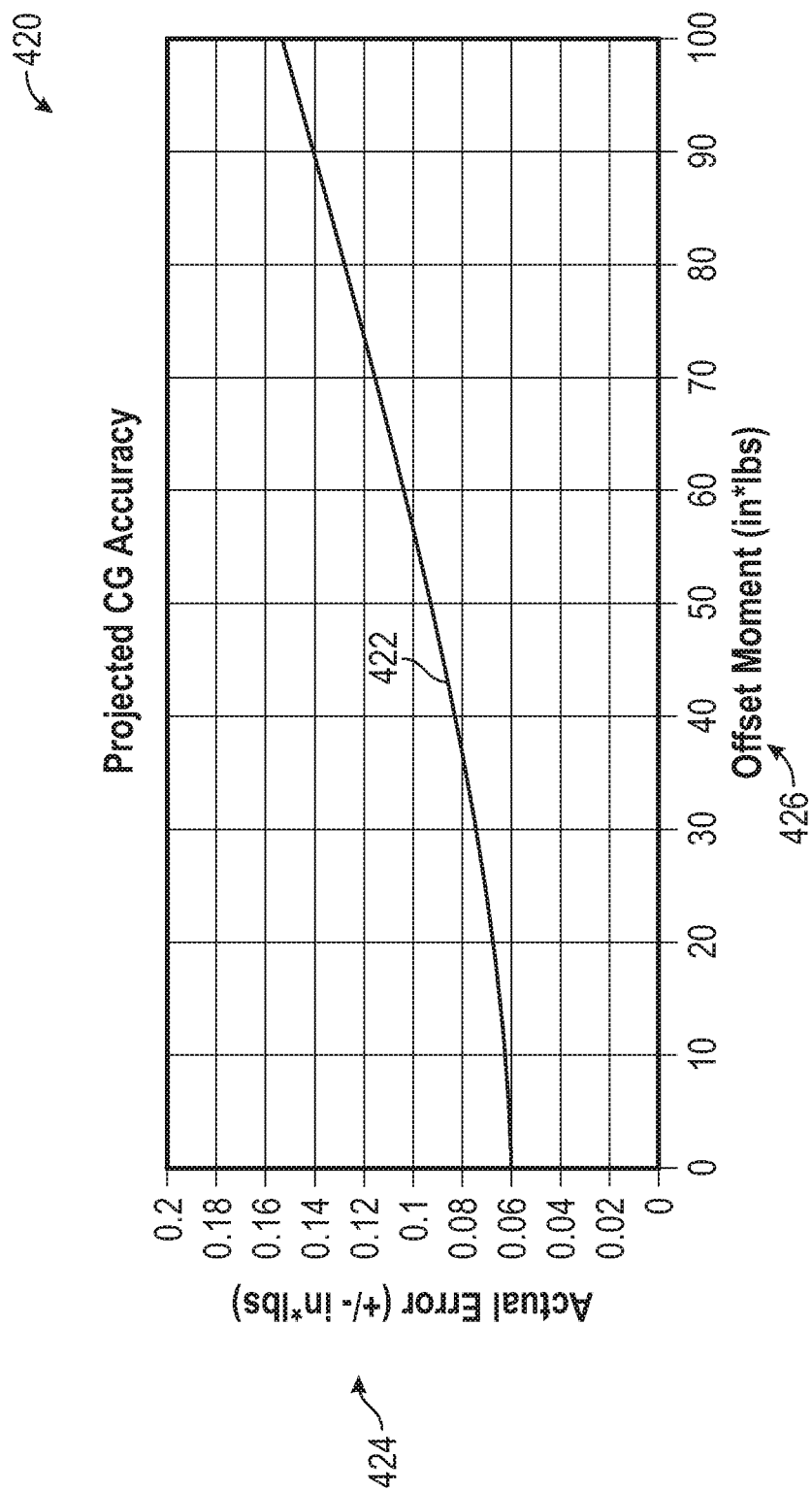
FIG. 4B is a plot showing one example of a relationship between an offset moment and actual error for a torque sensor.

FIG. 4B is a graduated accuracy plot graphically illustrating the increase of actual error with increasing offset moments based on the offset moment arm 414 and the mass of the work piece 108. The accuracy and offset line 422 shows the increasing actual error 424 as the offset moment 426 increases. In the example now, at 10 inch pounds the corresponding accuracy error is approximately ±0.065 inch pounds. While at 100 inch pounds of offset moment the accuracy error is approximately ±0.155 inch pounds, a full order of magnitude larger than the error at 10 inch pounds. The manipulation and testing systems 100 described herein are configured to test work pieces 108 having a variety of profiles (shapes, sizes or the like), and some work pieces weigh thousands of pounds and have large profiles. The large mass and size of some work pieces 108 enlarges the offset moment 426 and accordingly further increases the accuracy error 424 for measurements using one or more torque sensors in the mechanics sensor suite 200.

Figure 5:
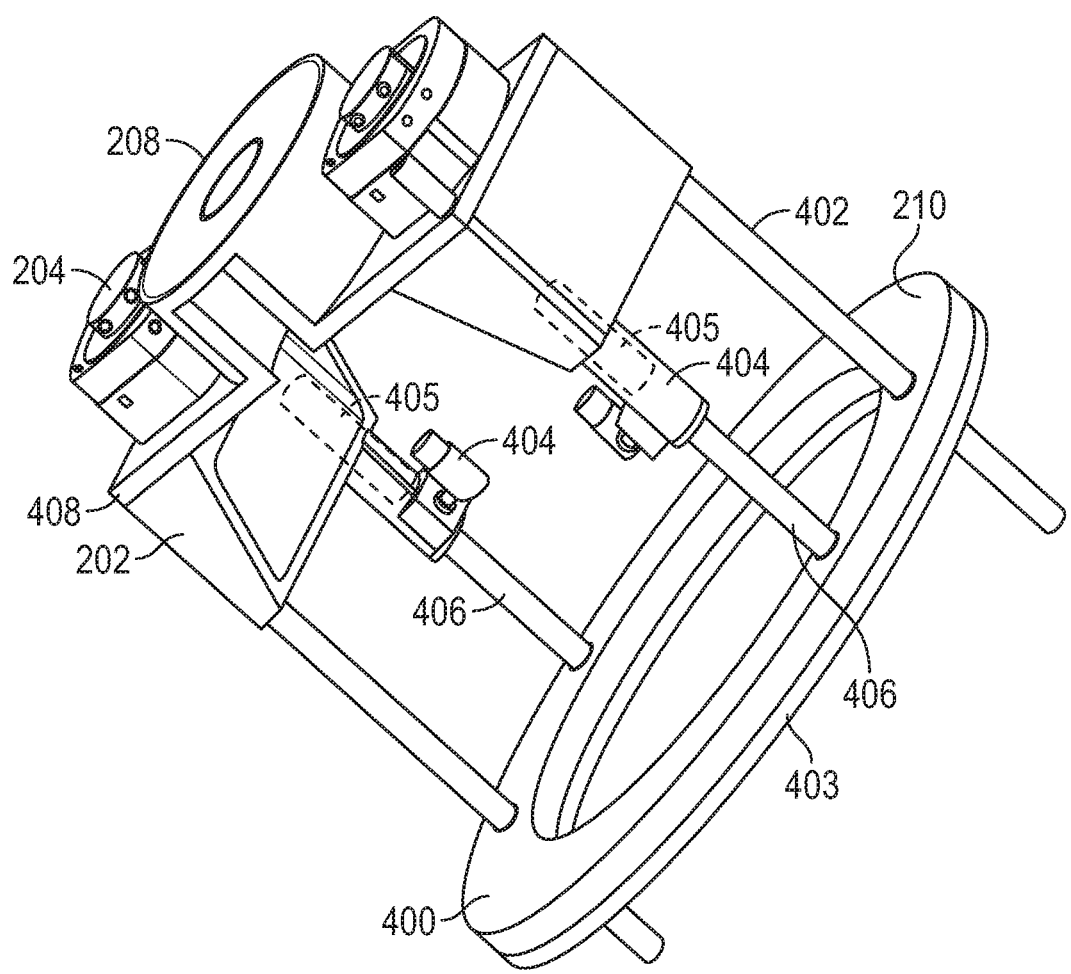
FIG. 5 is a detailed perspective view of an example adjustable ballast system.

FIG. 5 shows the adjustable ballast system 202 previously shown in FIG. 2. In FIG. 5, the system 202 is decoupled from the remainder of the effector assembly 106. The adjustable ballast system 202 includes a ballast bracket 408 that interposes at least a portion of the adjustable ballast system 202, such as the sensor interface 208, between the work piece and the mechanics sensor suite 200 shown in FIG. 3. Interposing of the sensor interface 208 between the mechanics sensor suite 200 and the work piece 108 facilitates the coupling of the work piece 108 to the adjustable ballast system 202 to provide a composite assembly of these components and facilitate repositioning of a composite center of mass, for instance proximate to the mechanics sensor suite 200 as described herein. Operation of the adjustable ballast system 202 moves the center of mass of the composite assembly as specified by one or more of a test scheme, error isolation scheme or the like described herein.

As further shown in FIG. 5, the adjustable ballast system 202 in this example includes a counter ballast 210 movably positioned relative to the ballast bracket 408. The counter ballast 210 includes an annular component weight or the like positioned around the remainder of the effector assembly 106. For instance, as shown in FIG. 2 the counter ballast 210 surrounds the effector assembly 106 and accordingly moves along a coincident axis to the effector assembly 106. The counter ballast 210 optionally includes a carriage 400 (another form of the counter ballast weight) movable along one or more guides 402. The carriage 400 provides a base for the coupling of additional counter ballast weights, for instance with work pieces that are relatively heavy, elongate or the like. In various examples the guides 402 extend from the ballast bracket 408 and provide one or more of rails, rods, posts, channels or the like to guide the movement of the counter ballast 210 toward and away from the ballast bracket 408, the sensor interface 208 and the mechanics sensor suite 200 (when coupled with the sensor interface 208).

Referring again to FIG. 5, the adjustable ballast system 202 optionally includes a ballast actuator 404 interposed between the ballast bracket 408 and the counter ballast 210. In one example the ballast actuator 404 includes a drive shaft 406 connected with the remainder of the actuator 404. Optionally, multiple actuators are coupled between the ballast bracket 408 and the counter ballast to minimize tilting or binding of the counter ballast 210 along the guides 402. The drive shaft 406 extends from the remainder of the actuator to the counter ballast 210. Operation of the ballast actuator 404 translates the drive shaft 406 and accordingly moves the counter ballast 210 toward and away from the sensor interface 208 and the mechanics sensor suite 200 when assembled with the effector assembly 106.

In various examples the ballast actuator 404 facilitates continuous positioning of the counter ballast 210 relative to the remainder of the adjustable ballast system 202. For instance, the counter ballast 210 is moved in a continuous manner (e.g., with infinite or near infinite resolution) toward and away from the sensor interface 208 to accordingly provide a continuously variable counter moment to the work piece 108. In one example, the ballast actuator 404 includes a piezo motor, screw drive, magnetic drive or the like that facilitates continuous (including near continuous movement) of the counter ballast 210 including but not limited to rotational/translational movement of the drive shaft 406, stepped linear translation, continuous linear translation or the like. Because the adjustable ballast system 202 provides continuous movement (including near continuous stepped movement) of the counter ballast 210 the applied counter torque is also continuously variable relative to the work piece. Instead of changing the mass, the adjustable counter ballast system 202 changes the moment arm between the counter ballast 210 and each of the mechanics sensor suite 200 and the work piece 108. Accordingly, the addition and subtraction of graduated weights and coupling and decoupling of each graduated weight as used in other systems is avoided. Instead, the counter ballast 210 is a consistent weight (optionally configured for a specific work piece 108 or the like) that is moved in a continuous fashion toward and away from the sensor interface 108. The corresponding counter moment provided to the sensor interface 208 in one example counters the moment applied by the work piece 108. Because the counter ballast 210 is moved in a continuous fashion toward and away from the sensor interface 208 the adjustment of the counter moment to the work piece 108 is correspondingly continuous as well. As described herein, the positionable counter ballast 210 provides a continuous corresponding counter moment to the work piece 108 that moves the effective center of mass (e.g., an adapted center of mass, composite center of mass or the like) of the composite assembly in a continuous fashion toward and away from the sensor interface 208 and the mechanics sensor suite 200.

Optionally, the adjustable ballast system 202 includes a ballast lock 405 configured to retain the counter ballast 210 at a specified location, for instance after positioning of an adapted center of mass of the work piece 108 and the adjustable ballast system 202 proximate to a sensing plane 410 (see FIG. 4A) of the mechanics sensor suite 200. In one example, a ballast lock 405 is a separate component from the ballast actuators 404. For instance, the ballast lock 405 is a clamp, foot or the like configured for engagement with a moving feature, such as the drive shafts 406 shown in FIG. 5. In other examples, one or more ballast locks 405 are included as components of the ballast actuators 404. For example, upon arresting movement with the ballast actuators 404 the moving components of the actuators automatically lock the counter ballast 210 at the corresponding location. In one example, piezo motors, magnetic drives, screw drives or the like automatically engage with corresponding components of the actuator such as the drive shafts 406 when depowered to ensure the counter ballast 210 is static. With the counter ballast 210 held static the adapted center of mass for the work piece 108 and the adjustable ballast system 202 remains at its specified position relative to mechanics sensor suite 200, for instance proximate to the sensing plane 410 for testing (e.g., center of mass or moment of inertia determination).

Figure 7A:
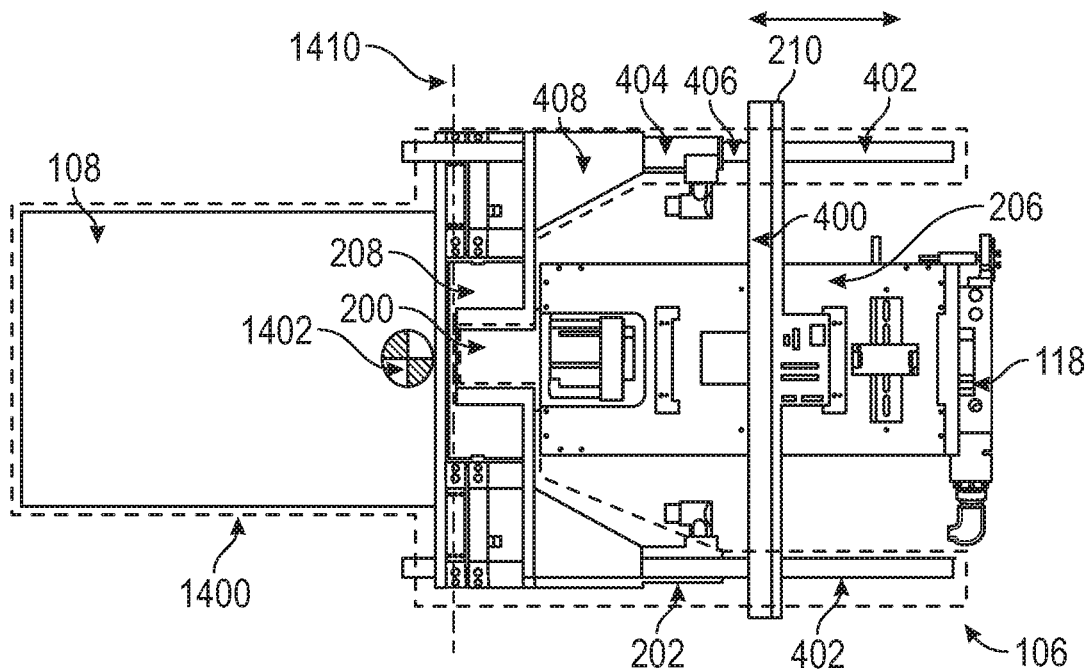
FIG. 7A is a cross sectional view of an example effector assembly including the adjustable ballast system of FIG. 5.

In some examples, the testing controller 128 shown in FIG. 1B moves the counter ballast 210 toward and away from the sensor interface 208 while measuring the resulting torque at the mechanics sensor suite 200 (see FIG. 3). In one example, the testing controller 128 moves the counter ballast 210 until the measured moment is proximate to zero (0.0) newton meters (or inch pounds) indicating the adapted center of mass of the composite assembly of the adjustable ballast system 202 and the work piece 108 is proximate to the mechanics sensor suite 200 (e.g., a sensing plane of the suite). FIGS. 7A, B show one example of implementation of a torque modulation scheme (e.g., as with corresponding positioning of a center of mass), for instance as an error isolation scheme initiated with the error isolation module 139 of FIG. 1B.

Figure 6A:
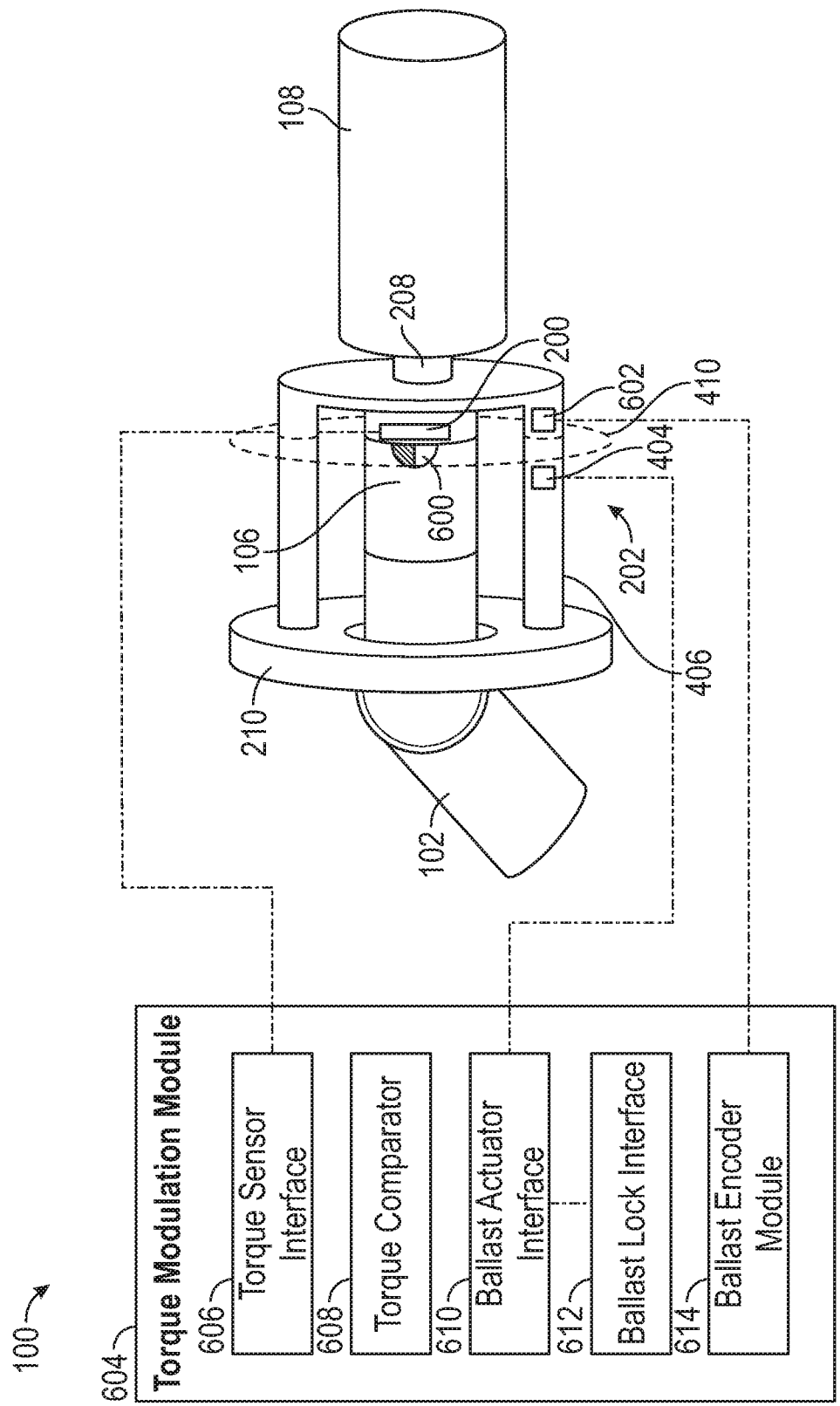
FIG. 6A is a schematic view of a manipulation and testing system having an adjustable ballast system and an example torque modulation module.
Figure 6B:
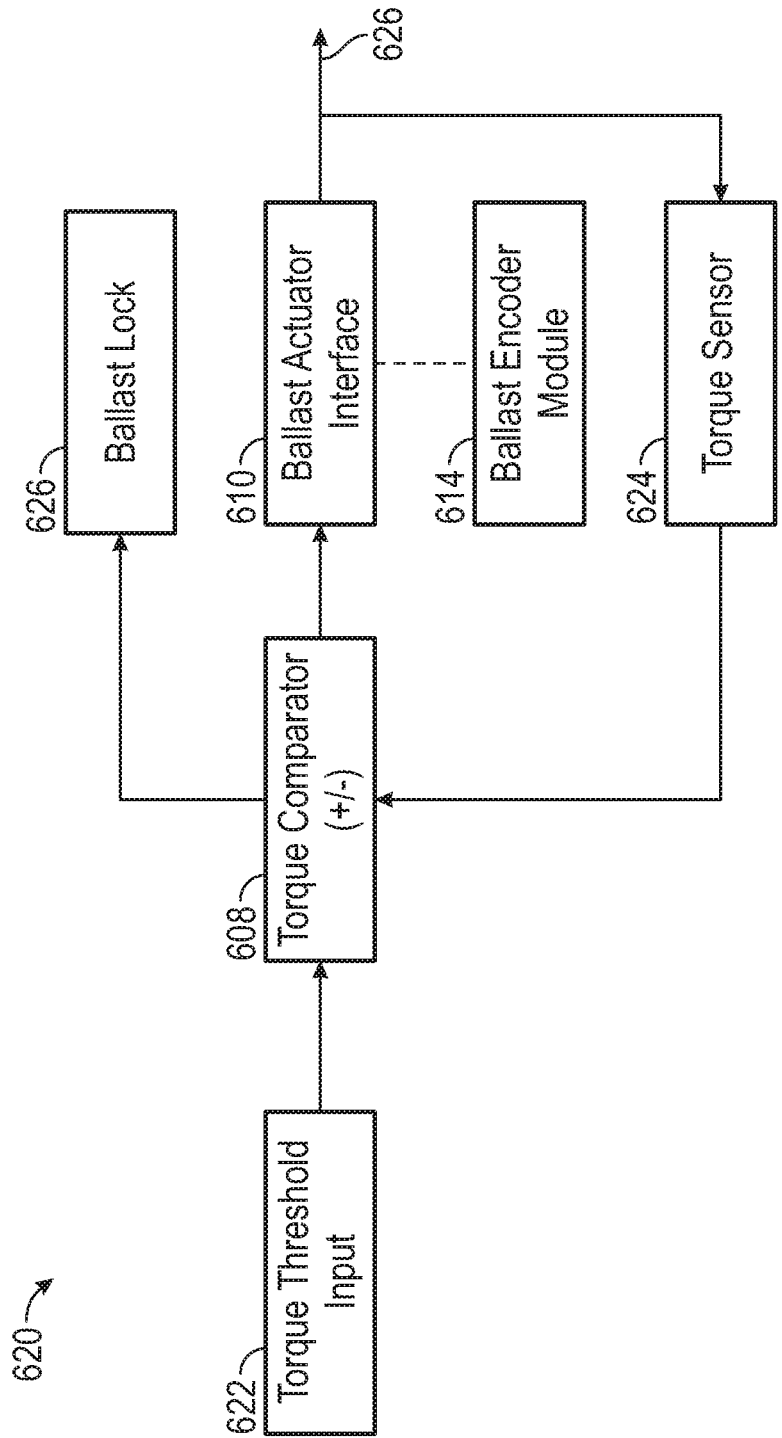
FIG. 6B is a schematic view of an example automated torque modulation system of the adjustable ballast system of FIG. 6A.

Referring now to FIGS. 6A and 6B provided respective schematic views of a torque modulation module 604 and operation of an automated torque modulation system 620. As shown in FIG. 6A, the torque modulation module 604 is in communication with components of one example of the manipulation and testing system 100. The torque modulation module 604 includes one or more sub-elements that are optionally separate components from the module (e.g., incorporated in other components of the testing controller in FIG. 1B) or components localized to the torque modulation module 604 itself. As described herein, the torque modulation module 604 communicates with the manipulation and testing system 100 including the effector assembly 106 and the remainder of the adjustable ballast system 202 to implement torque modulation including positioning of the adapted center of mass 600 of the composite assembly of the work piece 108 and the ballast system 202.

In FIG. 6A, a torque sensor interface 606 of the torque modulation module 604 is in communication with at least one torque sensor of the mechanics sensor suite 200. A ballast actuator interface 610 is in communication with one or more ballast actuators 404. In one example, a ballast lock interface 612 configured to selectively engage or disengage ballast locks (e.g., locks 405 shown in FIG. 5) as components of the actuators 404 or separate components from the actuators. In the example shown in FIG. 6A the locks are components of the ballast actuators 404. In another example, a ballast encoder module 612 of the module 604 is in communication with a ballast encoder coupled with one or more features of the adjustable ballast system 202, such as the drive shafts 406, guides 402 (see FIG. 5) or the like.

As described herein, the torque modulation module 604 (a component of the adjustable ballast system 202) operates one or more of the effector assembly 106, manipulation and testing system 100 and the adjustable ballast system to position the counter ballast 210 relative to the mechanics sensor suite 200 for instance having a sensing plane 410 at a sensor interface 208 between the work piece 108 and the ballast system 202. Movement of the counter ballast 210 corresponding changes the position of the adapted center of mass 600, moves the center of mass 600 into proximity with the mechanics sensor suite 200, and thereby minimizes loading of one or more torque sensors of the suite 200 (e.g., with an offset moment). As previously described herein and shown in FIG. 4B, minimizing of the offset moment 426 enhances accuracy of torque measurements by decreasing accuracy error 424.

FIG. 6B provides one example of an automated system, such as a closed loop (feedback) automated torque modulation system 620, illustrating example operation of the torque modulation module 604 to move the counter ballast 210 and thereby position the adapted center of mass 600 (see FIG. 6A). At 622 a torque threshold is input. For example, where minimal or null loading of the torque sensor of the mechanics sensor suite 200 is specified, the torque threshold is set at 0.0 Nm (or inch pounds), corresponding to specified positioning of the adapted center of mass 600 proximate to the sensing plane 410 of the mechanics sensor suite 200. In other examples, the torque threshold is set at a non-zero threshold, for instance in the middle of a specified operating range of one or more torque sensors (e.g., such as 55 Nm where the sensor measures torque from a non-zero origin such as 10 Nm to a maximum value of 100 Nm).

The torque sensor 624 in FIG. 6B and provided as at least one sensor of the mechanics sensor suite 300 in FIG. 6A measures the current torque load and communicates the value to a torque comparator 608. The torque comparator 608 compares the measured torque to the specified torque threshold, and delivers a difference value to the ballast actuator interface 610. The ballast actuator interface 610 operates the ballast actuators 404 to initiate movement of the counter ballast 210 based on the difference from the comparator 608 (e.g., based on sign of the difference). In an example, the ballast encoder module 614 is included with the torque modulation system to measure the position of the counter ballast 210, for instance to output to a technician, to ensure the counter ballast 210 is moving in correspondence to the determined difference or the like. At 626 the automated torque modulation system 620 outputs control to the one or more ballast actuators 404 to initiate movement of the counter ballast 210 and repositioning of the adapted center of mass 600 to achieve the input torque threshold. The torque sensor 624 continues to measure torque at the mechanics sensor suite 200 and provides an updated torque measurement to the torque comparator 608 to correspondingly update the difference.

Once the measured torque matches (is identical or approximately the same) the input torque threshold the torque comparator 608 provides a zero difference (or approximation approaching zero within specified tolerances) the ballast actuator interface arrests movement of the ballast actuators 404 and the counter ballast 210 comes to rest. Optionally, with the zero difference corresponding to achievement of the specified torque threshold and adapted center of mass 600 position the ballast lock 626 (e.g., ballast lock 405 in FIG. 5) is operated through the ballast lock interface 612 shown in FIG. 6A to anchor the counter ballast 210 at its location relative to the mechanics sensor suite 200. The composite assembly of the work piece 108 and the adjustable ballast system 202 includes the adapted center of mass 600 at location corresponding to the torque threshold (e.g., proximate to the mechanics sensor suite 200 in one example). With an input torque threshold of 0.0 inch pound (or Nm) the offset moment arm 414 shown in FIG. 4A is eliminated (including approximately eliminated, negligible or the like) and the corresponding offset moment 426 shown in FIG. 4B is minimized, for instance to 0.0 inch pounds (or Nm). As shown in FIG. 4B, the accuracy error 424 is thereby minimized, in that example to ±0.06 inch pounds. Torque measurements conducted with the one or more torque sensors of the mechanics sensor suite 200 accordingly have enhanced accuracy with operation of the adjustable ballast system 202 including the torque modulation module 604 shown in FIGS. 6A, B. In this configuration with the adapted center of mass 600 positioned as shown in FIG. 6A, the composite assembly is ready for testing including orientation into one or more test configurations, specified movement in the test configurations or the like.

Figure 7B:
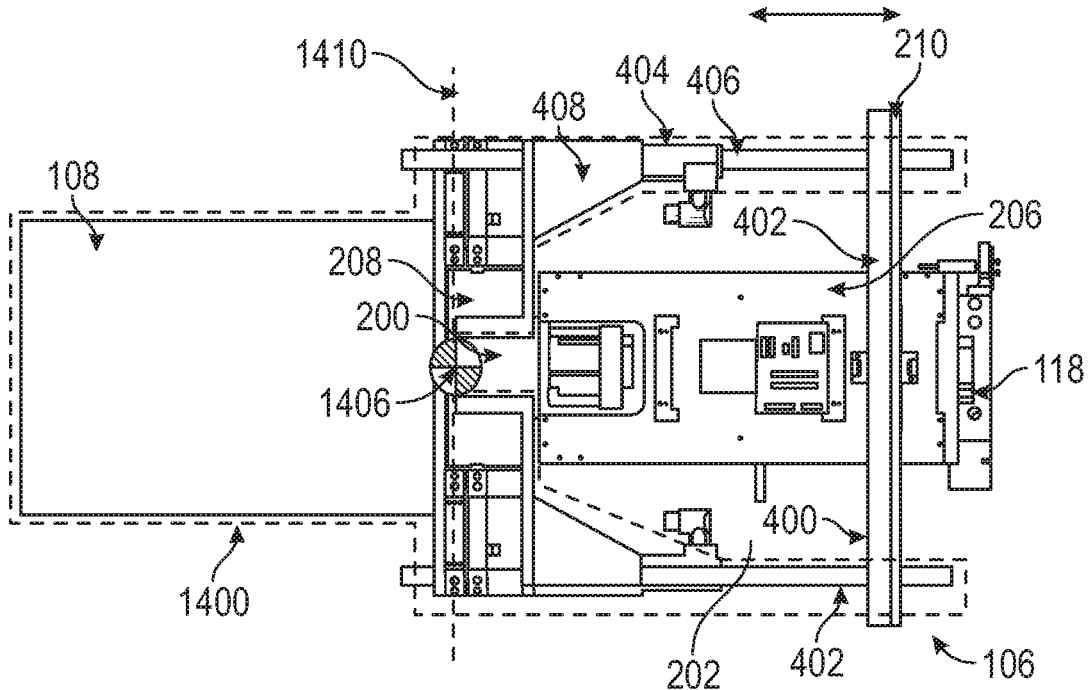
FIG. 7B is a cross sectional view of the effector assembly of FIG. 7A with an adapted center of mass proximate a mechanics sensor suite.

FIGS. 7A and 7B show side views of the effector assembly 106 including the work piece 108 coupled with the sensor interface 208 of the adjustable ballast system 202. The adjustable ballast system 202 is interposed between the work piece 108 and the remainder of the effector assembly 106. FIGS. 7A, B illustrate one example of operation of the adjustable ballast system 202 to position the composite center of mass 1402 (an adapted center of mass) of a composite assembly 1400 of the work piece 108 and the counter ballast 210 proximate to a sensing plane 1410 or a mechanics sensor suite 200 having the sensing plane 1410. Positioning of the composite center of massage 1402 proximate to either or both of the mechanics sensor suite 200 or the sensing plane 1410 facilitates the use of one or more torque sensors having a minimized operating range and a corresponding minimized error as previously described herein.

Referring now to FIG. 7A the effector assembly 106 includes the adjustable ballast system 202 coupled with the mechanics sensor suite 200, As shown, the adjustable ballast system 202 extends rearwardly along the effector frame 206 with one or more counter ballast components 210. In the example shown in FIG. 7A the counter ballast 210 includes one or more of the carriage 400 as well as additional counter ballast buckled or coupled with the carriage 400. In another example the carriage 400 comprises the only counter ballast coupled with the ballast actuator 404 and the guides 402.

As previously discussed herein and shown again in FIG. 7A the counter ballast 210 is coupled with one or more ballast actuators 404. The ballast actuators 404 are coupled with the counter ballast 210 with one or more drive shafts 406 configured to move the counter ballast 210 translationally, for instance toward or away from the mechanics sensor suite 200 and the work piece 108. As also shown in FIG. 7A one or more guides 402 are provided to guide and constrain movement of the counter ballast 210 to translational movement and minimize binding or seizing of the counter ballast 210.

Referring again to FIG. 7A, a composite assembly 1400 includes the work piece 108 and components of the adjustable ballast system 202 such as the ballast bracket 408 and the counter ballast 210. With the counter ballast 210 in the position shown in FIG. 7A the center of mass 1402 is shown offset relative to the sensing plane 1410 of the mechanics sensor suite 200 (similar to the configuration shown in FIG. 4A). Accordingly, in this configuration the mechanics sensor suite 200 including the one or more torque sensors experiences increased torque because the center of mass 1402 is offset and applies a moment at the mechanics sensor suite 200 (the offset corresponding to the offset moment arm 414 in FIG. 4A between the sensor suite 200 and the center of mass 110).

Referring now to FIG. 7B the counter ballast 210 is shown in a second configuration. In the second configuration the counter ballast 210 is translated relatively away from the configuration in FIG. 7A and is thereby remote relative to the original position. In one example, the testing controller 128 operates the adjustable ballast system 202 in cooperation with the mechanics sensor suite 200. For instance, the adjustable ballast system 202 is operated by the testing controller 128 (e.g., one or more of the test scheme module or error isolation module 138, 139) to move the counter ballast 210 and at the same time measure the torque at the mechanics sensor suite 200 in a closed loop, for instance with the automated torque modulation system 620 shown in FIG. 6B.

The counter ballast 210 is moved translationally relative to the mechanics sensor suite 200 until a minimized torque value is measured with one or more torque sensors of the suite 200. At this minimal torque value the adapted center of mass 1406 (the repositioned composite center of mass 1402 in FIG. 14A) of the composite assembly 1400 is proximate to the mechanics sensor suite 200 including, for instance, the sensing plane 1410. Optionally, positioning of the adapted center of mass 1406 in proximity to the mechanics sensor suite 200 or the sensing plane 1410 includes, but is not limited to, alignment of the adapted center of mass 1406 with the sensing plane 1410 or proximate positioning of the adapted center of mass 1406 immediately adjacent to the sensing plane 1410. In the configuration in FIG. 7B the torque experienced by the mechanics sensor suite 200 is minimized relative to the configuration shown in FIG. 7A to enhance accuracy as described herein. The minimized torque measurements facilitated with the adjustable ballast system 202 allow for the inclusion of torque sensors in the mechanics sensor suite 200 having a minimized operating range while permitting torque measurements of work pieces having masses of hundreds or thousands of pounds. The minimized operating ranges of torque sensors decreases the actual error realized with the mechanics sensor suite 200 with regard to at least torque sensing.

Because the counter ballast 210 is movable relative to the remainder of the adjustable ballast system 202 staggered operation including one or more of the addition or subtraction of ballast to one or more counter weights to the effector assembly 106 is avoided. Instead, the counter ballast 210 including one or more counter ballast plates, counter ballast components or the like are provided from the outset of adjustment of the center of mass 1402 of the composite assembly 1400 (FIG. 7A) to the adapted center of mass 1406 (FIG. 7B). Once the adjustable ballast system 202 begins operation the system 202 positions the counter ballast 210 and accordingly moves the adapted center of mass 1406 proximate to the sensing plane 1410 of the mechanics sensor suite 200 without pauses previously required for the addition or subtraction of supplemental counter weights with other systems. Instead, the counter ballast 210 is automatically moved by the one or more ballast actuators 404 in a continuous manner along the drive shafts 406 and guides 402, for instance with a high or infinite resolution according to the movement resolution of the ballast actuator 404.

Various Notes and Aspects

Aspect 1 can include subject matter such as a testing system configured to determine at least one physical characteristic of a work piece, the testing system comprising: an effector frame configured for coupling with a manipulator, the effector frame includes an effector interface configured for coupling with the manipulator assembly, and the effector frame includes at least one torque sensor; a ballast bracket configured for coupling between at least one torque sensor and the work piece, the ballast bracket includes: a sensor interface coupled with the at least one torque sensor; and at least one work piece latch configured for coupling with the work piece; a movable ballast assembly coupled with the ballast bracket, the movable ballast assembly includes: a counter ballast movably coupled with the ballast bracket and movable relative to the at least one torque sensor; and a ballast actuator coupled with the counter ballast and configured to move the counter ballast relative to the at least one torque sensor.

Aspect 2 can include, or can optionally be combined with the subject matter of Aspect 1, to optionally include torque modulation module in communication with the at least one torque sensor and the ballast actuator, the initialization module is configured to move the counter ballast and decrease torque measured with the at least one torque sensor.

Aspect 3 can include, or can optionally be combined with the subject matter of one or any combination of Aspects 1 or 2 to optionally include wherein the torque modulation module includes an initial torque threshold, and the torque modulation module is configured to move the counter ballast relative to the at least one torque sensor until the initial torque threshold is achieved.

Aspect 4 can include, or can optionally be combined with the subject matter of one or any combination of Aspects 1-3 to optionally include wherein the initial torque threshold is approximately zero (0) inch pounds.

Aspect 5 can include, or can optionally be combined with the subject matter of one or any combination of Aspects 1-4 to optionally include wherein the counter ballast is movable between proximate, remote locations relative to the at least one torque sensor along one or more guides.

Aspect 6 can include, or can optionally be combined with the subject matter of Aspects 1-5 to optionally include wherein the counter ballast includes: a carriage movably coupled along the one or more guides; and one or more supplemental ballast plates coupled with the carriage.

Aspect 7 can include, or can optionally be combined with the subject matter of Aspects 1-6 to optionally include wherein the counter ballast is continuously movable between proximate and remote locations relative to the at least one torque sensor, and configured for anchoring continuously between the proximate and remote locations.

Aspect 8 can include, or can optionally be combined with the subject matter of Aspects 1-7 to optionally include wherein the movable ballast system includes a ballast lock configured to continuously anchor the counter ballast between the proximate and remote locations.

Aspect 9 can include, or can optionally be combined with the subject matter of Aspects 1-8 to optionally include wherein the ballast actuator includes a ballast motor and a drive shaft coupled between the counter ballast and the ballast motor.

Aspect 10 can include, or can optionally be combined with the subject matter of Aspects 1-9 to optionally include wherein the counter ballast includes a counter ballast ring distributed around the at least one torque sensor.

Aspect 11 can include, or can optionally be combined with the subject matter of Aspects 1-10 to optionally include wherein the at least one torque sensor includes a longitudinal axis; and wherein a center axis of the counter ballast is coincident with the longitudinal axis of the torque sensor.

Aspect 12 can include, or can optionally be combined with the subject matter of Aspects 1-11 to optionally include a manipulator assembly coupled with the effector interface.

Aspect 13 can include, or can optionally be combined with the subject matter of Aspects 1-12 to optionally include wherein the effector frame is integral to the manipulator assembly.

Aspect 14 can include, or can optionally be combined with the subject matter of Aspects 1-13 to optionally include an adjustable ballast system comprising: a ballast bracket configured for coupling between at least one torque sensor and a work piece, the ballast bracket includes: a sensor interface configured for coupling with the at least one torque sensor; and at least one work piece latch configured for coupling with the work piece; a movable ballast assembly coupled with the ballast bracket, the movable ballast assembly includes: at least one guide extending away from the sensor interface; a counter ballast movably coupled along the at least one guide and configured for positioning along the at least one guide relative to the sensor interface; and a ballast actuator coupled with the counter ballast and configured to move the counter ballast along the at least one guide.

Aspect 15 can include, or can optionally be combined with the subject matter of Aspects 1-14 to optionally include wherein the counter ballast is continuously movable between proximate and remote locations relative to the sensor interface, and configured for anchoring continuously between the proximate and remote locations.

Aspect 16 can include, or can optionally be combined with the subject matter of Aspects 1-15 to optionally include wherein the movable ballast system includes a ballast lock configured to continuously anchor the counter ballast between the proximate and remote locations.

Aspect 17 can include, or can optionally be combined with the subject matter of Aspects 1-16 to optionally include wherein the ballast actuator includes a ballast motor and a drive shaft coupled between the counter ballast and the ballast motor.

Aspect 18 can include, or can optionally be combined with the subject matter of Aspects 1-17 to optionally include wherein the counter ballast includes: a carriage slidably coupled along the at least one guide; and one or more supplemental ballast plates coupled with the carriage.

Aspect 19 can include, or can optionally be combined with the subject matter of Aspects 1-18 to optionally include wherein the counter ballast includes a counter ballast ring distributed around a sensor cavity configured for reception of an effector frame or manipulator assembly.

Aspect 20 can include, or can optionally be combined with the subject matter of Aspects 1-19 to optionally include the torque sensor coupled with the sensor interface, and the torque sensor includes a longitudinal axis; and wherein a center axis of the counter ballast is coincident with the longitudinal axis of the torque sensor.

Aspect 21 can include, or can optionally be combined with the subject matter of Aspects 1-20 to optionally include a torque modulation module having an initial torque threshold, the torque modulation module in communication with the torque sensor and the ballast actuator, and the torque modulation module is configured to move the counter ballast relative to the sensor interface until the initial torque threshold is reached.

Aspect 22 can include, or can optionally be combined with the subject matter of Aspects 1-21 to optionally include wherein the initial torque threshold is approximately zero (0) inch pounds.

Aspect 23 can include, or can optionally be combined with the subject matter of Aspects 1-22 to optionally include a method for modulating a torque load comprising: coupling a work piece with a movable counter ballast, the work piece and the movable counter ballast are coupled with at least one torque sensor; positioning an adapted center of mass of a composite assembly of the work piece and the counter ballast, positioning the adapted center of mass includes: comparing a measured torque of the composite assembly with an initial torque threshold; moving the counter ballast relative to the at least one torque sensor according to the comparison; and repeating positioning until the measured torque approximates the initial torque threshold.

Aspect 24 can include, or can optionally be combined with the subject matter of Aspects 1-23 to optionally include wherein the counter ballast has a static mass, and moving the counter ballast relative to the least one torque sensor includes moving the static mass.

Aspect 25 can include, or can optionally be combined with the subject matter of Aspects 1-24 to optionally include wherein positioning the adapted center of mass includes positioning the adapted center of mass proximate to a sensing plane of the at least one sensor.

Aspect 26 can include, or can optionally be combined with the subject matter of Aspects 1-25 to optionally include wherein the initial torque threshold corresponding to the adapted center of mass proximate to the sensing plane is approximately 0.0 inch pounds or newton meters; moving the counter ballast relative to the at least one torque sensor includes moving the counter ballast away from the at least one torque sensor according to the comparison; and repeating positioning includes repeating positioning until the measured torque approximates 0.0 inches pounds or newton meters.

Aspect 27 can include, or can optionally be combined with the subject matter of Aspects 1-26 to optionally include wherein coupling the work piece with the movable counter ballast includes coupling the work piece with a ballast bracket coupled with the movable counter ballast, and the ballast bracket joins the counter ballast and the work piece with the at least one torque sensor.

Aspect 28 can include, or can optionally be combined with the subject matter of Aspects 1-27 to optionally include wherein moving the counter ballast includes driving the counter ballast with at least one ballast actuator coupled between the work piece and the counter ballast.

Aspect 29 can include, or can optionally be combined with the subject matter of Aspects 1-28 to optionally include wherein the counter ballast is distributed around a sensor cavity including the at least one torque sensor, and moving the counter ballast includes moving the counter ballast along a center axis of the counter ballast aligned with a longitudinal axis of the at least one torque sensor.

Aspect 30 can include, or can optionally be combined with the subject matter of Aspects 1-29 to optionally include wherein positioning the adapted center of mass includes maintaining a static counter balance mass while comparing the measured torque, moving the counter ballast and repeating positioning.

Aspect 31 can include, or can optionally be combined with the subject matter of Aspects 1-30 to optionally include wherein moving the counter ballast includes continuously moving the counter ballast with infinite resolution, and positioning the adapted center of mass accordingly includes position the adapted center of mass with infinite resolution.

Aspect 32 can include, or can optionally be combined with the subject matter of Aspects 1-31 to optionally include locking the counter ballast at a location relative to the at least one torque sensor with a ballast lock when the measured torque approximates the initial torque threshold.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part. Some aspects or examples can include a computer-readable medium or machine-readable medium encoded with instructions operable to configure an electronic device to perform methods as described in the above aspects or examples. An implementation of such methods can include code, such as microcode, assembly language code, a higher-level language code, or the like. Such code can include computer readable instructions for performing various methods. The code may form portions of computer program products. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the The claimed invention is:

1. A testing system configured to determine at least one physical characteristic of a work piece, the testing system comprising:
an effector frame configured for coupling with a manipulator assembly, the effector frame includes an effector interface configured for coupling with the manipulator assembly, and the effector frame includes at least one torque sensor;
a ballast bracket configured for coupling between the at least one torque sensor and the work piece, the ballast bracket includes:
a sensor interface coupled with the at least one torque sensor; and
at least one work piece latch configured for coupling with the work piece;
a movable ballast assembly coupled with the ballast bracket and remote from the manipulator assembly, the movable ballast assembly includes:
a counter ballast movably coupled with the ballast bracket and movable relative to the at least one torque sensor; and
a ballast actuator coupled with the counter ballast and configured to move the counter ballast relative to the at least one torque sensor, the work piece and the manipulator assembly.

2. The testing system of claim 1 comprising a torque modulation module in communication with the at least one torque sensor and the ballast actuator, the torque modulation module is configured to move the counter ballast and decrease torque measured with the at least one torque sensor.

3. The testing system of claim 2, wherein the torque modulation module includes an initial torque threshold, and the torque modulation module is configured to move the counter ballast relative to the at least one torque sensor until the initial torque threshold is achieved.

4. The adjustable ballast system of claim 3, wherein the initial torque threshold is approximately zero (0) inch pounds.

5. The adjustable ballast system of claim 1, wherein the counter ballast is movable between proximate, remote locations relative to the at least one torque sensor along one or more guides.

6. The adjustable ballast system of claim 5, wherein the counter ballast includes:
a carriage movably coupled along the one or more guides; and
one or more supplemental ballast plates coupled with the carriage.

7. The adjustable ballast system of claim 1, wherein the counter ballast is continuously movable between proximate and remote locations relative to the at least one torque sensor, and configured for anchoring continuously between the proximate and remote locations.

8. The adjustable ballast system of claim 7, wherein the movable ballast system includes a ballast lock configured to continuously anchor the counter ballast between the proximate and remote locations.

9. The adjustable ballast system of claim 1, wherein the ballast actuator includes a ballast motor and a drive shaft coupled between the counter ballast and the ballast motor.

10. The adjustable ballast system of claim 1, wherein the counter ballast includes a counter ballast ring distributed around the at least one torque sensor.

11. The adjustable ballast system of claim 1, wherein the at least one torque sensor includes a longitudinal axis; and
wherein a center axis of the counter ballast is coincident with the longitudinal axis of the torque sensor.

12. The adjustable ballast system of claim 1 comprising the manipulator assembly coupled with the effector interface.

13. The adjustable ballast system of claim 12, wherein the effector frame is integral to the manipulator assembly.

14. The adjustable ballast system of claim 1, wherein the movable ballast assembly is isolated from the manipulator assembly.

15. The adjustable ballast system of claim 1, wherein the movable ballast assembly is localized to the ballast bracket.

16. An adjustable ballast system comprising:
a ballast bracket configured for coupling between at least one torque sensor and a work piece, the ballast bracket includes:
a sensor interface configured for coupling with the at least one torque sensor; and
at least one work piece latch configured for coupling with the work piece; and
a movable ballast assembly coupled with the ballast bracket and separated from a manipulator assembly, the movable ballast assembly includes:
at least one guide extending away from the sensor interface;
a counter ballast movably coupled along the at least one guide and configured for positioning along the at least one guide relative to the sensor interface; and
a ballast actuator coupled with the counter ballast and configured to move the counter ballast along the at least one guide relative to the sensor interface, the work piece, and a manipulator assembly.

17. The adjustable ballast system of claim 16, wherein the counter ballast is continuously movable between proximate and remote locations relative to the sensor interface, and configured for anchoring continuously between the proximate and remote locations.

18. The adjustable ballast system of claim 17, wherein the movable ballast system includes a ballast lock configured to continuously anchor the counter ballast between the proximate and remote locations.

19. The adjustable ballast system of claim 16, wherein the ballast actuator includes a ballast motor and a drive shaft coupled between the counter ballast and the ballast motor.

20. The adjustable ballast system of claim 16, wherein the counter ballast includes:
a carriage slidably coupled along the at least one guide; and
one or more supplemental ballast plates coupled with the carriage.

21. The adjustable ballast system of claim 16, wherein the counter ballast includes a counter ballast ring distributed around a sensor cavity configured for reception of an effector frame or manipulator assembly.

22. The adjustable ballast system of claim 16 comprising the torque sensor coupled with the sensor interface, and the torque sensor includes a longitudinal axis; and
wherein a center axis of the counter ballast is coincident with the longitudinal axis of the torque sensor.

23. The adjustable ballast system of claim 22 comprising a torque modulation module having an initial torque threshold, the torque modulation module in communication with the torque sensor and the ballast actuator, and the torque modulation module is configured to move the counter ballast relative to the sensor interface until the initial torque threshold is reached.

24. The adjustable ballast system of claim 23, wherein the initial torque threshold is approximately zero (0) inch pounds.

25. A method for modulating a torque load comprising:
coupling a work piece with a movable counter ballast, the work piece and the movable counter ballast are coupled with at least one torque sensor, and the movable counter ballast is movable relative to the work piece, the at least one torque sensor and a manipulator assembly;
positioning an adapted center of mass of a composite assembly of the work piece and the counter ballast, positioning the adapted center of mass includes:
comparing a measured torque of the composite assembly with an initial torque threshold;
moving the counter ballast relative to the at least one torque sensor, the work piece and the manipulator assembly according to the comparison; and
repeating positioning until the measured torque approximates the initial torque threshold.

26. The method of claim 25, wherein the counter ballast has a static mass, and moving the counter ballast relative to the least one torque sensor includes moving the static mass.

27. The method of claim 25, wherein positioning the adapted center of mass includes positioning the adapted center of mass proximate to a sensing plane of the at least one sensor.

28. The method of claim 27, wherein the initial torque threshold corresponding to the adapted center of mass proximate to the sensing plane is approximately 0.0 inch pounds or newton meters;

moving the counter ballast relative to the at least one torque sensor includes moving the counter ballast away from the at least one torque sensor according to the comparison; and
repeating positioning includes repeating positioning until the measured torque approximates 0.0 inches pounds or newton meters.

29. The method of claim 25, wherein coupling the work piece with the movable counter ballast includes coupling the work piece with a ballast bracket coupled with the movable counter ballast, and the ballast bracket joins the counter ballast and the work piece with the at least one torque sensor.

30. The method of claim 25, wherein moving the counter ballast includes driving the counter ballast with at least one ballast actuator coupled between the work piece and the counter ballast.

31. The method of claim 25, wherein the counter ballast is distributed around a sensor cavity including the at least one torque sensor, and moving the counter ballast includes moving the counter ballast along a center axis of the counter ballast aligned with a longitudinal axis of the at least one torque sensor.

32. The method of claim 25, wherein positioning the adapted center of mass includes maintaining a static counter balance mass while comparing the measured torque, moving the counter ballast and repeating positioning.

33. The method of claim 25, wherein moving the counter ballast includes continuously moving the counter ballast with infinite resolution, and positioning the adapted center of mass accordingly includes position the adapted center of mass with infinite resolution.

34. The method of claim 25 comprising locking the counter ballast at a location relative to the at least one torque sensor with a ballast lock when the measured torque approximates the initial torque threshold.

* * * * *